(12) United States Patent
Azuara Gazo et al.

(10) Patent No.: US 11,503,677 B2
(45) Date of Patent: Nov. 15, 2022

(54) HOB DEVICE

(71) Applicant: BSH Hausgeräte GmbH, Munich (DE)

(72) Inventors: Jesus Enrique Azuara Gazo, Saragossa (ES); Clara Fuertes Pinol, Saragossa (ES); Javier Gil Cabrejas, Saragossa (ES); Javier Herrera Rodriguez, Saragossa (ES); David Ortiz Sainz, Pinseque (ES); Rosario Romeo Velilla, Saragossa (ES); Maria Valencia Betran, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 241 days.

(21) Appl. No.: 16/955,106

(22) PCT Filed: Nov. 27, 2018

(86) PCT No.: PCT/IB2018/059325
§ 371 (c)(1),
(2) Date: Jun. 18, 2020

(87) PCT Pub. No.: WO2019/135120
PCT Pub. Date: Jul. 11, 2019

(65) Prior Publication Data
US 2020/0374990 A1 Nov. 26, 2020

(30) Foreign Application Priority Data

Jan. 8, 2018 (ES) .............................. ES201830010

(51) Int. Cl.
*H05B 6/12* (2006.01)

(52) U.S. Cl.
CPC ................................ *H05B 6/1218* (2013.01)

(58) Field of Classification Search
CPC .... H05B 6/1218; H05B 6/1272; H05B 3/746; H05B 6/062; Y02B 40/00
(Continued)

(56) References Cited

U.S. PATENT DOCUMENTS

| 7,402,781 B2 * | 7/2008 | Kondo .................. H05B 6/1218 219/622 |
| 2003/0111460 A1 * | 6/2003 | Boegel ................. H05B 6/1218 219/622 |

(Continued)

FOREIGN PATENT DOCUMENTS

| ES | 2535356 A1 | 5/2015 |
| JP | 2009218040 A | 9/2009 |

(Continued)

OTHER PUBLICATIONS

National Search Report ES 201830010 dated Dec. 5, 2018.
International Search Report PCT/IB2018/059325 dated Mar. 4, 2019.

*Primary Examiner* — Dana Ross
*Assistant Examiner* — James F Sims, III
(74) *Attorney, Agent, or Firm* — Michael E. Tschupp; Andre Pallapies; Brando G. Braun

(57) ABSTRACT

A hob device, in particular induction hob device, includes a placement plate configured for placement of an item of cookware, at least two heating units for heating the item of cookware, and an illumination strip including a lighting unit and assigned in an operating state to the at least two heating units for marking the at least two heating units.

14 Claims, 13 Drawing Sheets

(58) Field of Classification Search
USPC ........................................ 219/618, 620, 624
See application file for complete search history.

(56) References Cited

U.S. PATENT DOCUMENTS

| | | |
|---|---|---|
| 2017/0280514 A1* | 9/2017 | Kim .................... H05B 6/1218 |
| 2018/0124879 A1 | 5/2018 | Burkhardt |
| 2018/0347823 A1 | 12/2018 | Camaēs Vera |

FOREIGN PATENT DOCUMENTS

| | | | |
|---|---|---|---|
| JP | 2009218106 A | 9/2009 | |
| JP | 2017033951 A | 2/2017 | |

* cited by examiner

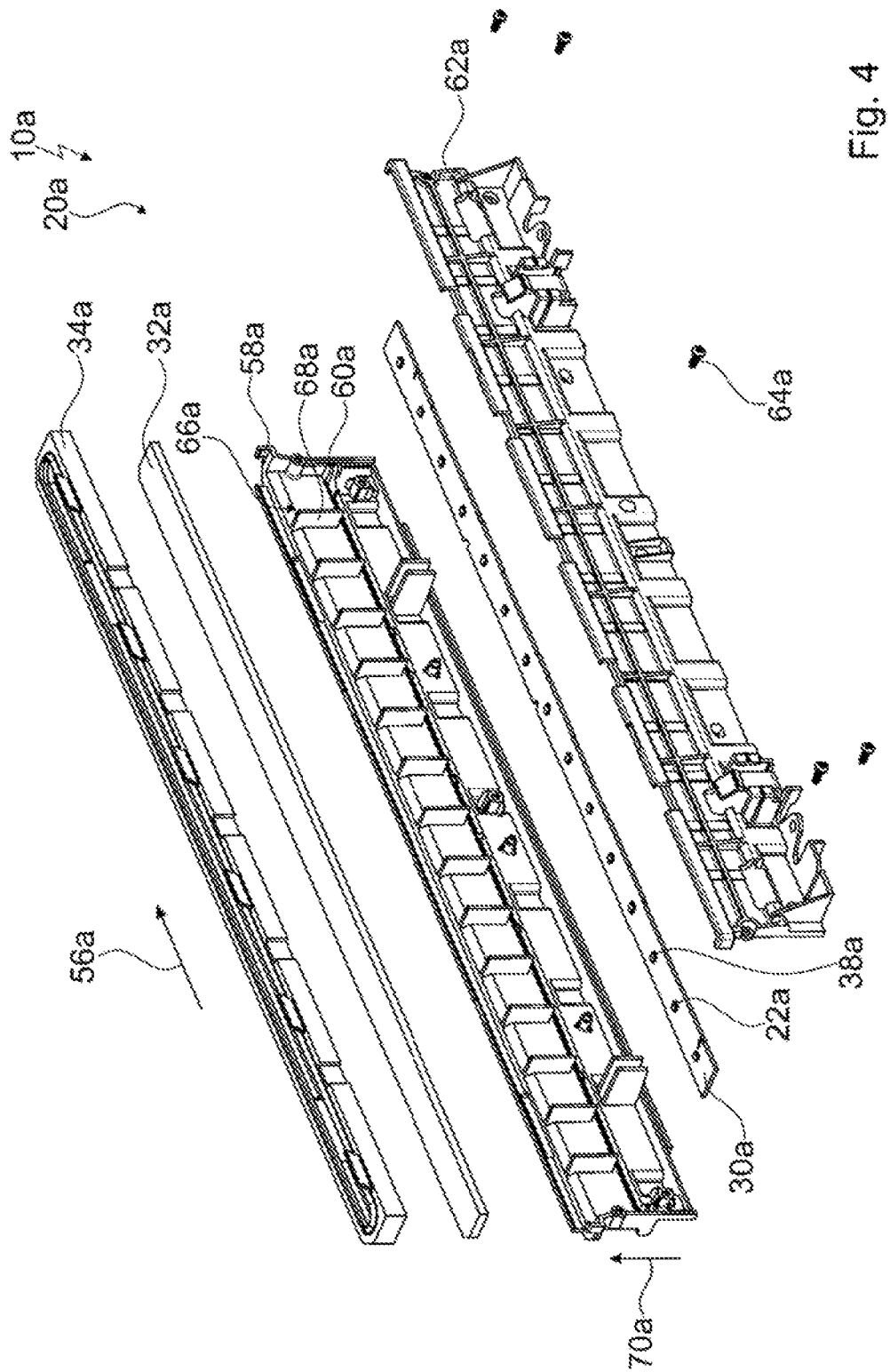

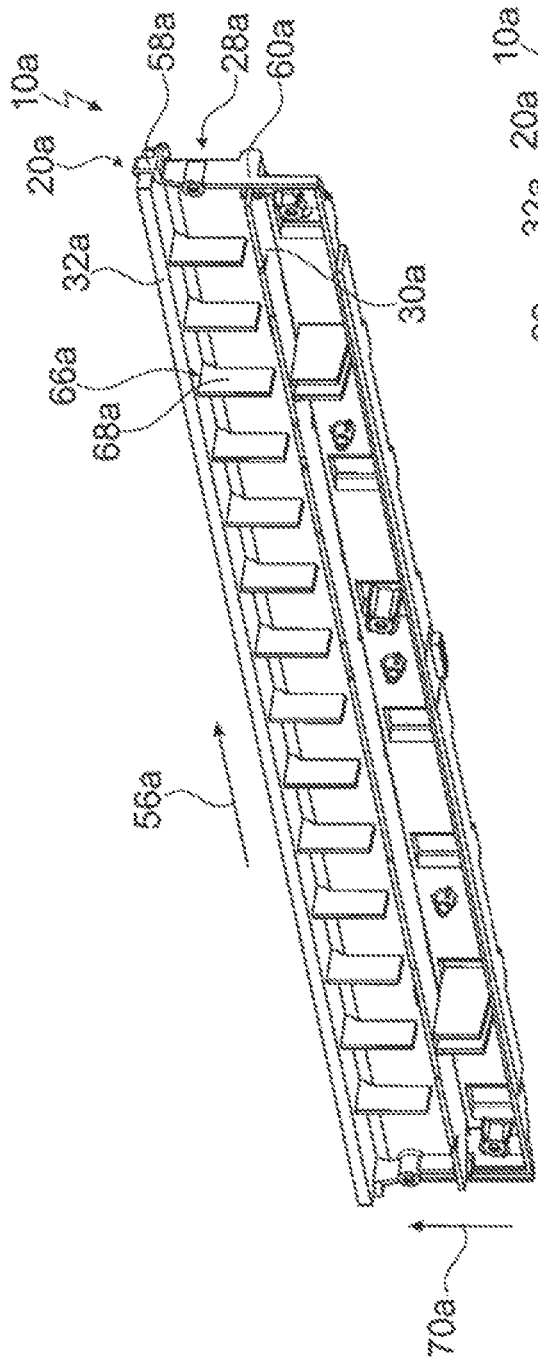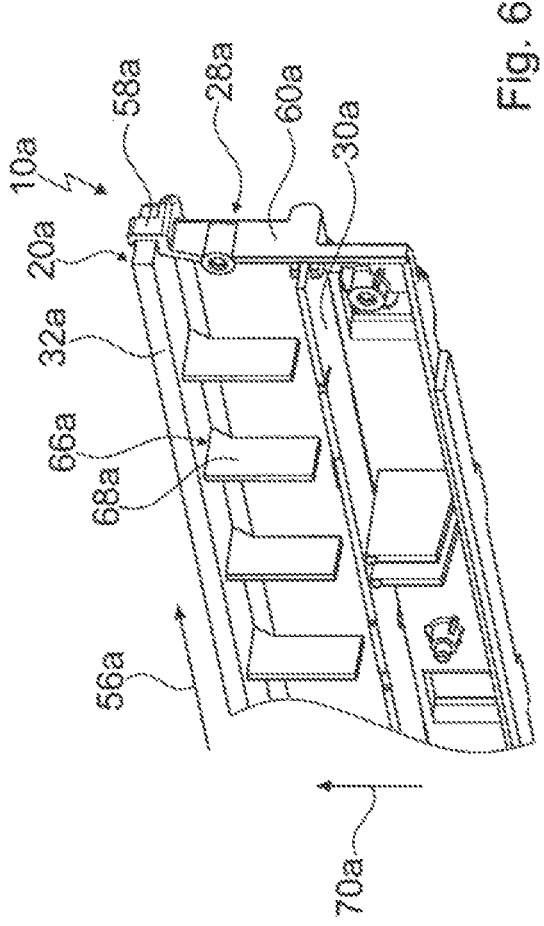

HOB DEVICE

CROSS-REFERENCES TO RELATED APPLICATIONS

This application is the U.S. National Stage of International Application No. PCT/IB2018/059325, filed Nov. 27, 2018, which designated the United States and has been published as International Publication No. WO 2019/135120 A1 and which claims the priority of Spanish Patent Application, Serial No. P201830010, filed Jan. 8, 2018, pursuant to 35 U.S.C. 119(a)-(d).

BACKGROUND OF THE INVENTION

The invention relates to a hob device and a method for operating a hob device.

Already known from the international patent application WO 2017/093850 A1 is a hob device, which has a placement plate embodied as a hob plate and eight heating units, which are arranged below the hob plate in an installed position. The hob device has a plurality of illumination strips. Two illumination strips are assigned to a single heating unit in each case. In this context, the illumination strips assigned to the heating unit are arranged on mutually opposing sides of the heating unit in relation to a transverse direction. In an operating state, by means of a varying intensity in a depth direction of illumination strips which are adjacent in the depth direction, the illumination strips indicate a variation of a heating output of heating units which are adjacent in the depth direction.

Already known from the international patent application WO 2017/093850 A1 is a hob device, which has a placement plate embodied as a hob plate and three heating units. The hob device additionally has three illumination units, which each have three lighting units which are embodied as individual light sources and accordingly differ from a lighting strip. Lighting units adjacent to one another have a spacing of at least 40 mm.

BRIEF SUMMARY OF THE INVENTION

The object of the invention consists in particular in providing a generic device with improved properties with respect to illumination. The object is achieved according to the invention by the features of the independent claims, while advantageous embodiments and developments of the invention can be taken from the subclaims.

The invention is based on a hob device, in particular on an induction hob device, with at least one placement plate, which is provided for a placement of at least one item of cookware, with at least two heating units for heating the item of cookware and with at least one, in particular dynamic, illumination strip, which in particular has a main function in the form of an illumination and/or in the form of an output of at least one item of information.

It is proposed that the illumination strip has at least one lighting unit and, in at least one operating state, is assigned to the at least two heating units for marking the at least two heating units.

By way of the embodiment according to the invention, it is in particular possible to achieve particularly advantageous illumination properties. In particular, an illumination can be adapted to the at least two heating units, in particular to an activity status of the at least two heating units, in a flexible manner. In particular, a low amount of stockkeeping and/or a low number of structural units can be enabled, which in particular makes it possible to enable a simple and/or rapid assembly. It is particularly possible to expand an output region, which is normally restricted to a user interface, whereby information output by means of the illumination strips can be identified by a user in a particularly simple manner, which in particular can be achieved from a size of the output region and/or from a proximity of the output region in relation to the item of cookware.

A "hob device", in particular an "induction hob device", is to be understood in particular as meaning at least one part, in particular a subassembly, of a hob, in particular of an induction hob.

A "placement plate" is to be understood in particular as meaning at least one, in particular plate-like, unit which is provided for a placement of at least one item of cookware and/or a setting down of at least one food to be cooked for the purpose of heating. The placement plate could be embodied, for example, as a subregion of at least one worktop, in particular of at least one kitchen worktop, in particular of a cooking system. As an alternative or in addition, the placement plate could be embodied as a hob plate. The placement plate embodied as a hob plate could, in particular, embody at least one part of a hob outer housing and, in particular, could at least largely embody the hob outer housing together with at least one outer housing unit, to which the placement plate embodied as hob plate could be connected in particular in at least one assembled state. The placement plate could be formed, for example, at least largely from glass and/or from glass ceramic and/or from Neolith and/or from Dekton and/or from wood and/or from marble and/or from stone, in particular from natural stone, and/or from laminate and/or from metal and/or from plastic and/or from ceramic. "At least largely" is to be understood in particular as meaning in a proportion, in particular a mass proportion and/or volume proportion, of at least 70%, in particular of at least 80%, advantageously of at least 90% and preferably of at least 95%.

A "heating unit" is to be understood in this context in particular as meaning a unit, which is provided in at least one operating state to feed energy to at least one item of cookware for the purpose of heating the item of cookware. For example, the heating unit could be embodied as a resistance heating unit and in particular be provided to convert energy into heat and to feed this to the item of cookware for the purpose of heating the item of cookware. As an alternative or in addition, the heating unit could be embodied as an induction heating unit and in particular be provided to feed energy to the item of cookware in the form of an electromagnetic alternating field, wherein the energy fed to the item of cookware in particular could be converted into heat in the item of cookware. In at least one operating state, the heating unit feeds energy to the item of cookware in particular, specifically for heating and/or warming the item of cookware in particular. In particular, the hob device has at least three, in particular at least four, advantageously at least six, particularly advantageously eight and preferably a large number of heating units. In particular, the heating units, in particular the hob device, define at least one variable cooking surface region and are arranged in a matrix-like manner in particular.

An "illumination strip" is to be understood in particular as meaning a unit which has an elongated shape and which, in at least one operating state, in particular provides an illumination which is at least substantially continuous. In particular, the illumination strip differs from at least one display. In particular, the illumination strip indicates the extension of the at least two heating units in real space, which differs in particular from a virtual representation of an extension, such as on a display for example. In at least one operating state, the illumination strip is in particular arranged at a distance from at least one user interface, which in particular could have at least one display for outputting at least one operating parameter. In particular, the hob device has at least one user interface, which in particular is provided for inputting and/or outputting at least one operating parameter. The illumination strip in particular has a main function in the form of illuminating and/or outputting at least one item of information and in particular is embodied such that it is distinct from an operating strip of the user interface, the main function of which is in particular operating and/or inputting at least one item of information and/or at least one operating instruction. In particular, the illumination strip is free of sensor elements, which in particular are provided for detecting at least one operating input. By embodying illumination strip and user interface separately, it is advantageously possible to enable a high level of flexibility and/or a high level of design freedom with regard to an arrangement of the illumination strip. In particular, the illumination strip can be arranged in a vicinity of the heating units and/or in a region of increased temperature, specifically in particular while avoiding a risk of an erroneous input by means of the user interface and/or while avoiding a risk of an erroneous detection of an operating instruction.

An "elongated" shape of an object is to be understood in particular as meaning a shape, in which a longitudinal extension of the object is at least three times, in particular at least five times, advantageously at least seven times, particularly advantageously at least ten times and preferably at least fifteen times as large as extensions of the object oriented perpendicular to the longitudinal extension. A "longitudinal extension" of an object is to be understood in particular as meaning an extension of the object along a longitudinal extension direction of the object. A "longitudinal extension direction" of an object is to be understood in particular as meaning a direction which is oriented in parallel with a longest side of a smallest notional geometrical cuboid, which only just fully encloses the object. An "extension" of an object is to be understood in particular as meaning a maximum distance between two points of a perpendicular projection of the object on a plane.

An "at least substantially continuous" illumination is to be understood in particular as meaning a continuous illumination and/or an illumination provided by a large number of lighting units, in which lighting units adjacent to one another, in particular directly, have a spacing of a maximum of 35 mm, in particular of a maximum of 30 mm, advantageously of a maximum of 25 mm, particularly advantageously of a maximum of 20 mm, preferably of a maximum of 15 mm and particularly preferably of a maximum of 10 mm. For example, the illumination strip could have a light source, in particular a single light source, which in at least one operating state in particular provides an at least substantially continuous illumination and in particular could be embodied as a lighting tube, advantageously as a fluorescent tube. As an alternative or in addition, the illumination strip could have at least two, in particular at least three, advantageously at least four and preferably a large number of lighting units, which could be embodied as lighting tubes in each case and which could have a spacing of a maximum of 35 mm, in particular of a maximum of 30 mm, advantageously of a maximum of 25 mm, particularly advantageously of a maximum of 20 mm, preferably of a maximum of 15 mm and particularly preferably of a maximum of 10 mm. As an alternative or in addition, the illumination strips could have a large number of lighting units, which in at least one operating state in particular could provide an at least substantially continuous illumination and in which in particular lighting units adjacent to one another, in particular directly, could have a spacing of a maximum of 35 mm, in particular of a maximum of 30 mm, advantageously of a maximum of 25 mm, particularly advantageously of a maximum of 20 mm, preferably of a maximum of 15 mm and particularly preferably of a maximum of 10 mm.

A "lighting unit" is to be understood in particular as meaning a unit which, in at least one operating state, emits and/or provides electromagnetic radiation, in particular in the form of visible light. In particular, the lighting unit has at least one light source. For example, the lighting unit could have precisely one light source, such as at least one lighting tube for example, in particular at least one fluorescent tube. As an alternative or in addition, the lighting unit could in particular have at least two, advantageously at least three, particularly advantageously at least four and preferably a large number of light sources. For example, the light sources could be embodied as an LED in each case and in particular embody a common assembly unit and/or be arranged within a common lighting unit housing unit.

A "large number" is to be understood in particular as meaning a number of at least five, in particular of at least six, advantageously of at least eight, particularly advantageously of at least ten, preferably of at least twelve and particularly preferably of at least fifteen. In particular, the illumination strip has a large number of lighting units, which in particular are arranged such that they are distributed in a longitudinal extension direction of the illumination strip, in particular in an at least substantially uniform manner. In an installed position, the illumination strip in particular is contact with a rear side of the placement plate, which in particular is embodied as a side of the placement plate remote from a user in an installed position. The placement plate in particular has at least one surface subregion, the illumination strip in particular being provided for the illumination thereof. In particular, in at least one operating state, the illumination strip illuminates the surface subregion and in particular, on the rear side of the placement plate, is in contact with a subregion of a rear side of the placement plate opposite the surface subregion.

A "dynamic" illumination strip is to be understood in particular as meaning an illumination strip which, in at least one operating state, is provided to vary at least one marking property, in particular as a function of an actuation of the illumination strip by at least one control unit, advantageously in a deliberate manner. The deliberate variation of a marking property differs in particular from a variation of the marking property which occurs due to a temperature effect and/or due to deterioration and/or due to wear. A "marking property" is to be understood in particular as meaning a property of an actual marking. In at least one operating mode, the marking property is visible for a user, in particular on an ongoing basis. The marking property could be an illumination property in particular. In particular, the marking could be an illumination. For example, the hob device, in particular in addition to the dynamic illumination strip, could have at least one static lighting strip, which could be provided for marking the at least two heating units. The static illumination strip could be, for example, a marking of the at least two heating units which has been introduced into a surface of the placement plate.

In particular, the hob device has at least one control unit, which in particular is provided at least for controlling and/or for operating the illumination strip. A "control unit" is to be understood in particular as meaning an electronic unit which is preferably at least partially integrated into a control and/or regulating unit of a hob, in particular an induction hob, and which is preferably provided in order to control and/or regulate at least the illumination strip and/or the heating units. Preferably, the control unit comprises a processing unit and in particular, in addition to the processing unit, a memory unit with a control and/or regulation program stored therein, which is provided to be executed by the processing unit. In particular, in the event of an item of cookware being placed, the control unit is provided in order to form at least one heating zone for heating the placed item of cookware from the heating units. The control unit is provided in particular for actuating the illumination strip.

The illumination strip in particular has at least one illumination control unit, which is provided in particular for actuation by the control unit and/or for communication with the control unit. In at least one operating state, the illumination control unit in particular actuates the lighting unit and controls and/or regulates light emitted by the lighting unit in particular. In particular, the illumination control unit and the control unit are arranged and/or embodied separately from one another, in particular spatially, and in particular as stand-alone units. In at least one operating state, the illumination control unit and the control unit communicate with one another in particular. In particular, a user is able to activate and/or deactivate the illumination strip in particular, specifically by means of at least one operating input by means of at least one user interface in particular. For example, in at least one operating state, the illumination control unit could communicate with at least one user interface, in particular the hob device.

The expression that the illumination strip is "assigned" to the at least two heating units is to be understood in particular as meaning that, in at least one operating state, the illumination strip illuminates the at least two heating units and/or that, in at least one operating state, the illumination strip is arranged in a vicinity of the at least two heating units. In at least one operating state, the illumination strip extends across a portion of at least 60%, in particular of at least 70%, advantageously of at least 80%, particularly advantageously of at least 90% and preferably of at least 95% of an extension of the at least two heating units in at least one direction, in which the at least two heating units are arranged adjacent to one another.

For example, the at least two heating units could be arranged adjacent to one another in at least one transverse direction. A "transverse direction" is to be understood in particular as meaning a direction which is oriented at least substantially in parallel with a front edge of the placement plate. In particular, the at least two heating units are arranged adjacent to one another in at least one depth direction. A "depth direction" is to be understood in particular as meaning a direction which is oriented at least substantially perpendicular to a front edge of the placement plate and which in particular points from a region close to a user to a region remote from a user. The transverse direction and the depth direction are oriented in particular at least substantially perpendicularly to one another and in particular at least substantially in parallel with a main extension plane of the placement plate.

A "main extension plane" of an object is to be understood in particular as meaning a plane which is in parallel with a largest side area of a smallest notional geometrical cuboid, which only just fully encloses the object, and in particular runs through the center point of the cuboid. "Substantially in parallel" is to be understood here in particular as meaning an orientation of a direction relative to a reference direction, in particular in a plane, wherein compared to the reference direction the direction has a deviation of in particular less than 8°, advantageously less than 5° and particularly advantageously less than 2°. The phrase "substantially perpendicular" is to be understood here in particular as meaning an orientation of a direction relative to a reference direction, wherein the direction and the reference direction, in particular when viewed in a plane, enclose an angle of 90° and the angle has a maximum deviation of in particular less than 8°, advantageously less than 5° and particularly advantageously less than 2°.

"Provided" is to be understood in particular as meaning especially programmed, configured and/or equipped. The fact that an object is provided for a particular function is to be understood in particular as meaning that the object fulfills and/or carries out this particular function in at least one application and/or operating state.

In a further aspect of the invention, which can be considered on its own or together with other aspects of the invention, it is proposed that the illumination strip has a longitudinal extension of at least 200 mm, in particular of at least 250 mm, advantageously of at least 300 mm, particularly advantageously of at least 350 mm, preferably of at least 400 mm and particularly preferably of at least 450 mm. This means that it is in particular possible to illuminate a large region, such as a variable cooking surface region in particular, by means of the illumination strip, which in particular makes it possible to dispense with further illumination strips and/or to achieve a low amount of stockkeeping.

In a further aspect of the invention, which can be considered on its own or together with other aspects of the invention, it is proposed that the illumination strip has at least one lighting unit and, in at least one operating state, in relation to at least one direction, indicates at least one operating parameter which varies in the direction. For example, the direction could be oriented at least substantially in parallel with the transverse direction and/or at least substantially perpendicular to the depth direction. Advantageously, the direction is oriented at least substantially in parallel with the depth direction and/or at least substantially perpendicular to the transverse direction. The operating parameter, for example, could be at least one temperature, to which an item of cookware is to be heated in particular, and/or at least one heating output, by means of which an item of cookware is heated in particular and/or which a corresponding heating unit of the at least two heating units provides in at least one operating state in particular. The illumination strip could indicate the operating parameter which varies in the direction in particular by means of at least one change in an intensity and/or a color and/or a brightness and/or a saturation. This in particular makes it possible to achieve a high level of operating convenience, as a user is able to identify the operating parameter in a simple and rapid manner in particular.

It is additionally proposed that the illumination strip extends at least substantially over an entire depth extension of the placement plate. The expression that the illumination strip extends "at least substantially" over an entire depth extension of the placement plate is to be understood in particular as meaning that the illumination strip extends over a portion of at least 60%, in particular of at least 70%, advantageously of at least 80%, particularly advantageously of at least 90% and preferably of at least 95% of a depth extension of the placement plate. A "depth extension" of an object is to be understood in particular as meaning an extension of the object in the depth direction. This means that it is in particular possible to illuminate at least substantially the entire depth extension of the placement plate by means of a single illumination strip, which in particular makes it possible to dispense with further illumination strips and/or to achieve a low amount of stockkeeping.

It is furthermore proposed that the illumination strip has at least one housing unit, within which the illumination unit is at least largely arranged. A "housing unit" is to be understood in particular as meaning a unit which, in at least one assembled state, at least partially delimits and/or defines at least one receiving space, in particular embodied as a hollow space, for receiving and/or for storing at least one object. The object could be the lighting unit and/or at least one circuit board of the illumination strip, for example. In particular, the housing unit and at least one diffusion unit of the illumination strip at least substantially delimit the receiving space, in particular together. The receiving space is embodied as a hollow space in particular. In at least one assembled state, the housing unit in particular at least largely absorbs a weight force of objects and/or transfers the weight force to at least one further unit, for example to the placement plate and/or to a hob housing unit of the hob device. In particular, the hob device has the hob housing unit. This makes it possible to arrange the lighting unit in a safe and/or protected manner in particular, which in particular makes it possible to enable a long-lasting embodiment.

The illumination strip could have at least one supply unit, for example, which, in at least one operating state, could supply the lighting unit with energy and, in at least one operating state in particular, could be arranged at least largely within the housing unit. Preferably, the illumination strip has at least one circuit board, which is arranged at least largely within the housing unit and on which the lighting unit is arranged. A "circuit board" is to be understood in particular as meaning a unit which, in at least one operating state, carries at least one electrical and/or electronic structural unit and which in particular is provided for mechanically fastening and/or for electrically contacting at least one electrical and/or electronic structural unit. In particular, the circuit board at least largely consists of electrically insulating material. In particular, the circuit board has at least one conductor path and at least one base body, on which the conductor path is at least largely arranged. This makes it possible in particular to achieve a particularly advantageous illumination. By arranging the circuit board within the housing unit, the circuit board can in particular be arranged such that it is protected and/or in a region with a lower temperature and/or at a distance from the placement plate, which in particular makes it possible to achieve a long-lasting embodiment and/or to enable a use of cost-effective electronic and electrical objects and/or lighting units.

Additionally, it is proposed that the illumination strip has at least one diffusion unit, which is provided for scattering light emitted by the lighting unit. A "diffusion unit" is to be understood in particular as meaning a unit which is provided to transmit a portion of at least 75%, in particular of at least 80%, advantageously of at least 85%, particularly advantageously of at least 90% and preferably of at least 95% of light striking a first side to a second side opposite the first side, and in particular to vary a direction of said portion of the light. The diffusion unit is in particular provided to transmit a portion of a maximum of 10%, in particular of a maximum of 8%, advantageously of a maximum of 5%, particularly advantageously of a maximum of 3% and preferably of a maximum of 1% of light striking a first side to a second side opposite the first side, and in particular to allow this portion of the light to pass unchanged. Advantageously, the diffusion unit is at least substantially plate-shaped, which in particular makes it possible to manufacture the diffusion unit in a particularly simple and/or cost-effective manner and/or which in particular makes it possible to achieve a particularly compact embodiment. In particular, the diffusion unit has at least one longitudinal extension and in particular at least one transverse extension, which is in particular oriented perpendicular to the longitudinal extension, which in particular are significantly larger than a thickness of the diffusion unit. In particular, the longitudinal extension of the diffusion unit and in particular additionally the transverse extension of the diffusion unit are oriented in parallel with a main extension plan of the diffusion unit. For example, the diffusion unit could at least largely consist of glass and/or of glass ceramic and/or of plastic and/or of silicone. As a result, a particularly homogeneous illumination can be provided in particular, which in particular makes it possible to achieve a high level of operating convenience for a user. In particular, an illumination consisting of individual pixels and/or luminous spots can be avoided and/or an advantageously consistent continuum of illumination can be provided.

For example, the diffusion unit could be arranged on the placement plate and in particular embodied as a layer, for example as a coating and/or as a finish and/or as a film. The diffusion unit in particular could be connected to the placement plate, in particular to a rear side of the placement plate, with a material fit. Preferably, the diffusion unit is arranged on the housing unit. For example, the diffusion unit could be arranged at and/or on a surface of the housing unit. As an alternative or in addition, the diffusion unit could be arranged at least partially and in particular at least largely within the housing unit. In at least one operating state, the housing unit in particular carries the diffusion unit and in at least one operating state in particular at least largely absorbs a weight force of the diffusion unit and/or transfers the weight force to at least one further unit, for example to the placement plate and/or to a hob housing unit of the hob device. This makes it possible in particular to provide a compact illumination strip, which in particular can be embodied and/or assembled as a pre-assembled unit.

It is further proposed that the illumination strip has at least one seal unit, which is provided for sealing off at least one lighting region between the housing unit and the placement plate. In at least one operating state, the seal unit at least substantially seals off at least one lighting region between the housing unit and the placement plate. The seal unit in particular at least largely consists of elastic material, for example of silicone and/or plastic and/or rubber. In particular, the seal unit has a temperature resistance of at least 120° C., in particular of at least 150° C., advantageously of at least 180° C., particularly advantageously of at least 200° C. and preferably of at least 220° C. In particular, the hob device has the lighting region. In particular, the illumination strip, in particular the housing unit and/or the seal unit of the illumination strip, at least partially defines the lighting region. In particular, the placement plate at least partially defines the lighting region. In particular, the illumination strip, in particular the housing unit and/or the seal unit of the illumination strip, and the placement plate define the lighting region together. In at least one operating state, the lighting region is arranged, in particular spatially and advantageously in relation to at least one vertical direction, between the housing unit and the placement plate in particular and is at least largely enclosed by the seal unit in particular. A "vertical direction" is to be understood in particular as meaning a direction which, in at least one operating state, is oriented at least substantially perpendicular to a main extension plane of the placement plate. In at least one operating state, the seal unit is in particular in contact with the placement plate in a form-fit manner and is in particular pressed against the placement plate. In at least one operating state, the seal unit in particular is in contact with the placement plate, in particular with an underside of the placement plate, and in particular reduces a pressure exerted upon the placement plate, specifically in particular compared to an embodiment which avoids a seal unit and/or an embodiment with an at least substantially rigid seal unit. As a result, in particular it is possible to avoid a penetration of foreign bodies, such as impurities and/or dust and/or movable objects during assembly for example, into the lighting region, which in particular makes it possible to achieve an uninterrupted and/or optimized illumination.

In at least one operating state, for example, the seal unit could be arranged above the housing unit and advantageously between the housing unit and the placement unit, in relation to at least one vertical direction. Preferably, the seal unit encloses at least one housing section of the housing unit and in particular at least one diffusion unit section of the diffusion unit, at least in sections. The expression that the seal unit encloses at least one section of a unit "at least in section" is to be understood in particular as meaning that the seal unit encloses the section in at least one plane, which in particular is oriented at least substantially in parallel with a main extension plane of the placement plate, in relation to a geometrical center point and/or center of gravity of the unit in the plane over an angular range of at least 180°, in particular of at least 270°, advantageously of at least 300°, particularly advantageously of at least 330° and preferably of at least 350°. In particular, in at least one assembled state, the seal unit is in contact with the housing section of the housing unit and/or with the diffusion unit section of the diffusion unit in a form-fit manner. As a result, the lighting region in particular can be sealed off optimally between the housing unit and the placement plate, which in particular makes it possible to enable an optimized illumination.

The illumination strip for example could have precisely one, in particular single, lighting unit, which in particular could be embodied as a lighting tube and advantageously as a fluorescent tube. Preferably, the illumination strip has at least one further lighting unit and at least one light separating unit, which in the operating state is provided for an at least partial separation of light portions from the lighting unit and light portions from the further lighting unit. In particular, the light separating unit could be embodied as a light guiding unit and could be provided for guiding light portions from the lighting unit and light portions from the further lighting unit. In at least one operating state, the light separating unit is arranged within the housing unit in particular. In particular, in at least one operating state, the light separating unit is arranged on the housing unit and in particular is connected to the housing unit at least with a material fit, advantageously in one piece. In particular by connecting the light separating unit to the housing unit in one piece, it is possible in particular to enable a best possible embodiment of the light separating unit, in particular for separating light portions from the lighting unit and light portions from the further housing unit. In particular, a simple manufacturing can be achieved, specifically compared to alternative hob devices with a light separating unit in particular. "In one piece" is to be understood in particular as meaning connected with a material fit, for example by a welding process, an adhesive bonding process, an injection molding process and/or another process appearing sensible to the person skilled in the art, and/or advantageously understood as meaning molded in one piece, such as by manufacturing from a cast iron and/or by manufacturing in a single or multi-component injection method and advantageously from a single blank. In at least one operating state, the light separating unit in particular at least substantially prevents mixing light portions from the lighting unit and light portions from the further lighting unit. As a result, unintentional interference effects between light portions from the lighting unit and light portions from the further lighting unit can be avoided in particular, which in particular makes it possible to mark the at least two heating units in an optimal manner.

It is furthermore proposed that the illumination strip has at least one keep-clear element, which during assembly is provided for preventing a penetration of at least one object into at least one lighting region at least partially defined by the illumination strip, which in at least one assembled state is arranged between the housing unit and the placement plate in particular. In particular, the keep-clear element is arranged on the seal unit and advantageously is connected to the seal unit with a material fit, in particular in one piece. In particular, the keep-clear element is embodied as a tab and advantageously as a flexible tab. For example, the object could have at least one cable. As an alternative or in addition, the object could have at least one insulating unit, in particular at least one insulating plate, which in particular could be provided for insulating the placement plate and the at least two heating units from one another and advantageously could at least largely consist of plastic mica. A lighting region "at least partially" defined by the illumination strip is to be understood in particular as meaning a lighting region which is defined by the illumination strip alone or by the illumination strip and at least one further structural unit, such as the placement plate for example. As a result, an uninterrupted illumination can be provided in particular, which in particular makes it possible to enable a high level of operating convenience.

In addition, it is proposed that the hob device has at least one hob outer housing unit, which at least partially defines at least one storage space and within which the illumination strip is at least largely arranged. A "hob outer housing unit" is to be understood in particular as meaning a unit which, in at least one operating state, at least partially delimits and/or defines at least one receiving space, in particular embodied as a hollow space, for receiving and/or for storing at least one part. The part could be at least one heating unit and/or a control unit and/or a supply unit and/or a user interface, for example. In particular, the hob outer housing unit and the placement plate at least substantially delimit the receiving space, in particular together. The receiving space is embodied as a hollow space in particular. In at least one assembled state, the hob outer housing unit in particular at least largely absorbs a weight force of parts and/or transfers the weight force to at least one further unit, for example to the placement plate. Advantageously, the hob outer housing unit is embodied as an outer housing unit and at least substantially defines a hob outer housing, in particular together with the placement plate. In at least one operating state, the illumination strip is surrounded by walls of the hob outer housing unit, in particular in at least one plane, which in particular is oriented at least substantially in parallel with a main extension plane of the placement plate, specifically in particular in relation to a center point and/or center of gravity of the illumination strip over an angular range of at least 180°, in particular of at least 270°, advantageously of at least 300°, particularly advantageously of at least 330° and preferably of at least 350°. As a result, a protected arrangement of the illumination strip can be enabled in particular, which in particular makes it possible to achieve a long-lasting embodiment, specifically in particular compared to an embodiment in which the illumination strip is part of a wall of the hob outer housing unit.

For example, the illumination strip could have at least one fastening element, which could be provided for fastening the housing unit to a hob housing side wall of the hob outer housing unit. Preferably, the illumination strip has at least one fastening element, which is provided for fastening the housing unit to a hob housing base of the hob outer housing unit. In particular, in at least one operating state, the hob housing base defines at least one side of the hob outer housing unit remote from a user. The fastening element could, for example, fasten the housing unit to the hob housing base of the hob outer housing unit by way of a detent connection and/or by way of a screw connection and/or by way of a connection caused by clamping and/or by way of a connection caused by latching. This in particular makes it possible to ensure a particularly high level of stability.

A particularly optimized illumination can be achieved in particular by a hob, in particular by an induction hob, with at least one hob device.

An illumination can be further optimized in particular by a method for operating a hob device, wherein at least two heating units are marked by means of a single illumination strip.

In this context, the hob device should not be restricted to the use and embodiment described above. In particular, the hob device may have a number of individual elements, parts and units deviating from a number mentioned herein for fulfilling a mode of operation described herein.

Further advantages result from the following description of the drawing. The drawing shows exemplary embodiments of the invention. The drawing, the description and the claims contain numerous features in combination. The person skilled in the art will expediently also consider the features individually and combine them to form useful further combinations.

BRIEF DESCRIPTION OF THE DRAWINGS

In the drawing:

FIG. 4 shows the illumination strip from FIG. 3 in a perspective exploded representation, FIG. 5 shows a housing subelement of a housing unit, a circuit board and a diffusion unit of the illustration strip from FIG. 3 in a perspective representation, FIG. 6 shows an enlarged portion of FIG. 5.

DETAILED DESCRIPTION OF EXEMPLARY EMBODIMENTS OF THE PRESENT INVENTION

Figure 1:
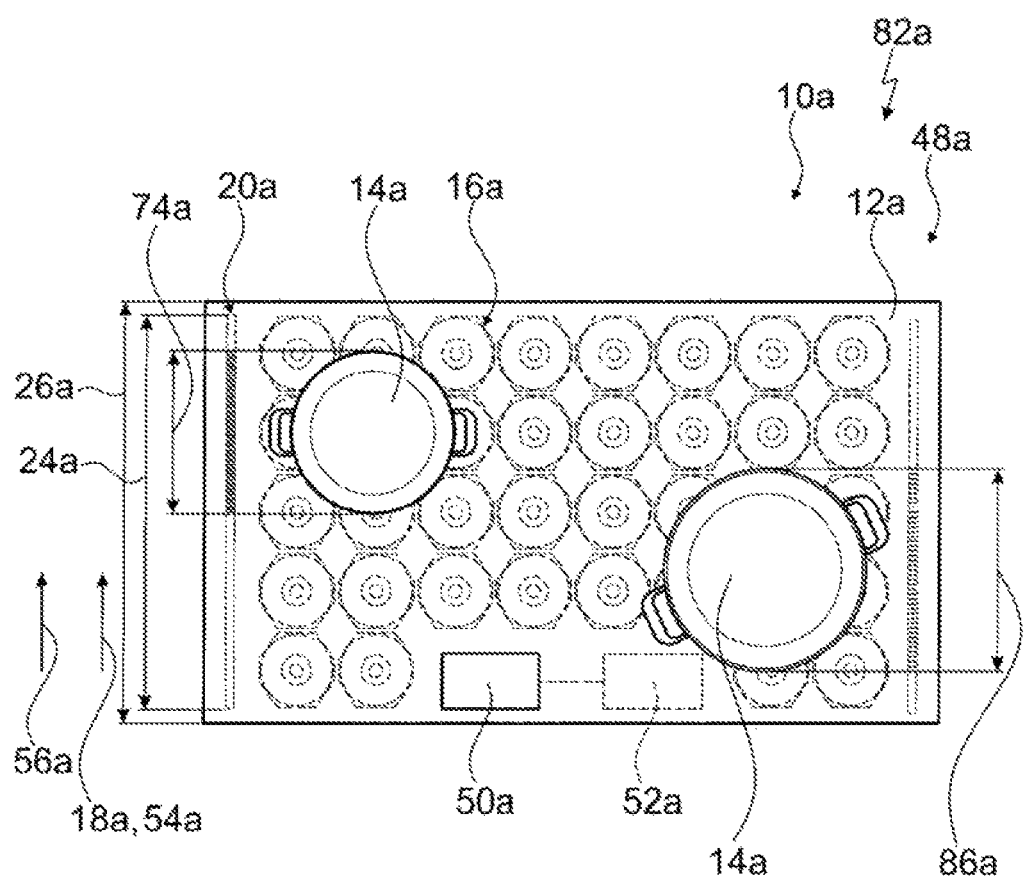
FIG. 1 shows a cooking system with a hob, which has a hob device, and with two items of cookware in an operating state in a schematic plan view.

FIG. 1 shows a cooking system 82a with a hob 48a and with two items of cookware 14a. The hob 48a is embodied as an induction hob. The hob 48a has a hob device 10a, which is embodied as an induction hob device.

The hob device 10a has a placement plate 12a. In the present exemplary embodiment, the placement plate 12a is embodied as a hob plate. In an assembled state, the placement plate 12a embodies part of a hob outer housing, specifically in particular of a hob outer housing of the hob 48a in particular. The placement plate 12a is provided for a placement of items of cookware 14a (see FIGS. 1 and 11 to 17).

The hob device 10a has a large number of heating units 16 for heating items of cookware 14a. Only one of the objects present repeatedly in the figures is provided with a reference character in each case. In the present exemplary embodiment, the hob device 10a has thirty six heating units 16a. The heating units 16a are arranged below the placement plate 12a in an installed position. The heating units 16a are provided to heat items of cookware 14a placed on the placement plate 12a above the heating units 16a. In the present exemplary embodiment, the heating units 16a are embodied as induction heating units.

The hob device 10a has a user interface 50a for inputting and/or selecting operating parameters, for example a heating output and/or a heating output density and/or a heating zone. The user interface 50a is provided for outputting a value of an operating parameter to a user.

The hob device 10a has a control unit 52a. The control unit 52a is provided to carry out actions and/or to vary settings as a function of operating parameters input by means of the user interface 50a. The control unit 52a regulates an energy supply to the heating units 16a in a heating operating state.

Figure 2:
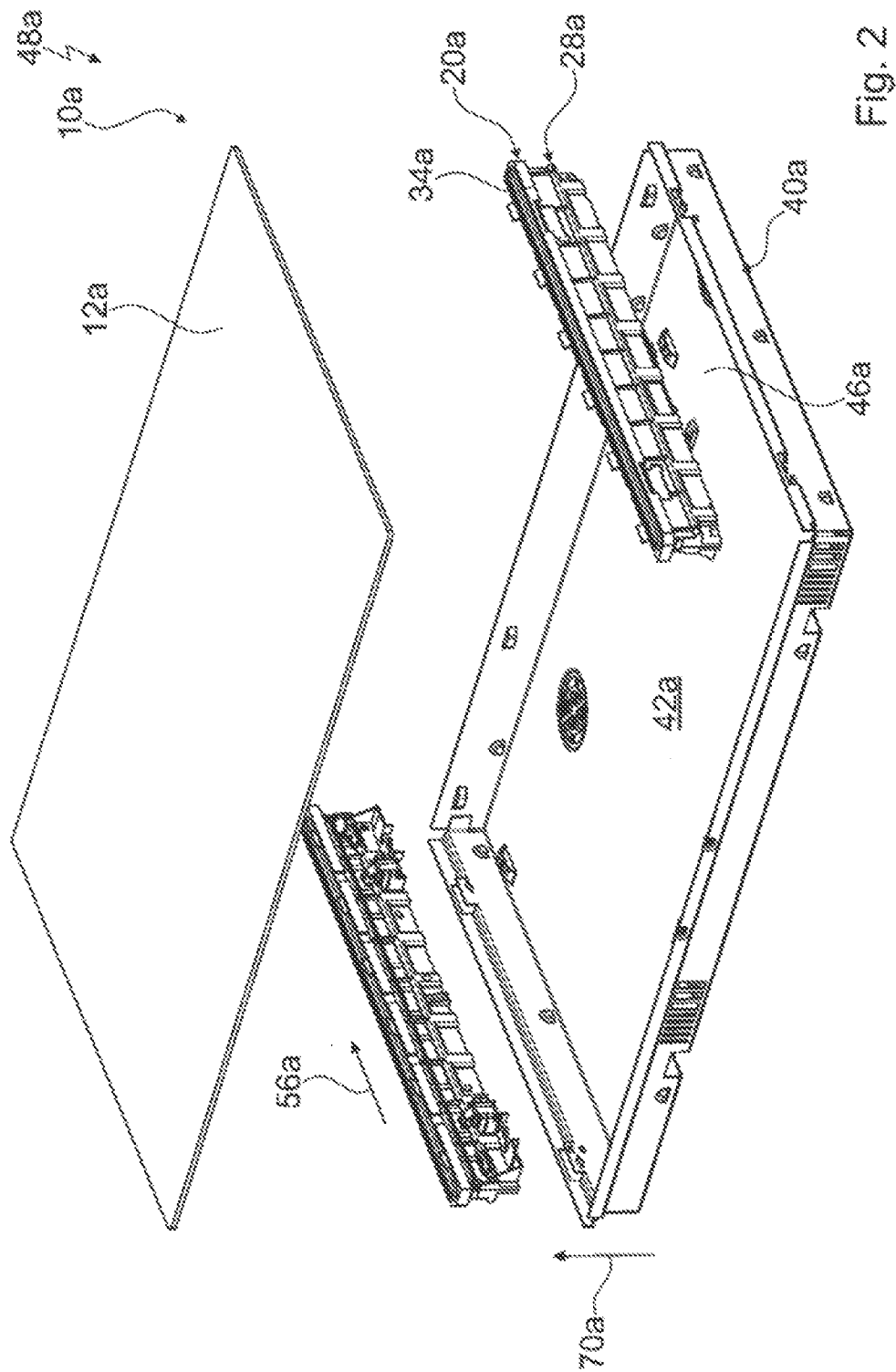
FIG. 2 shows a hob housing unit, a placement plate and two illumination strips of the hob device in a schematic exploded representation.
Figure 3:
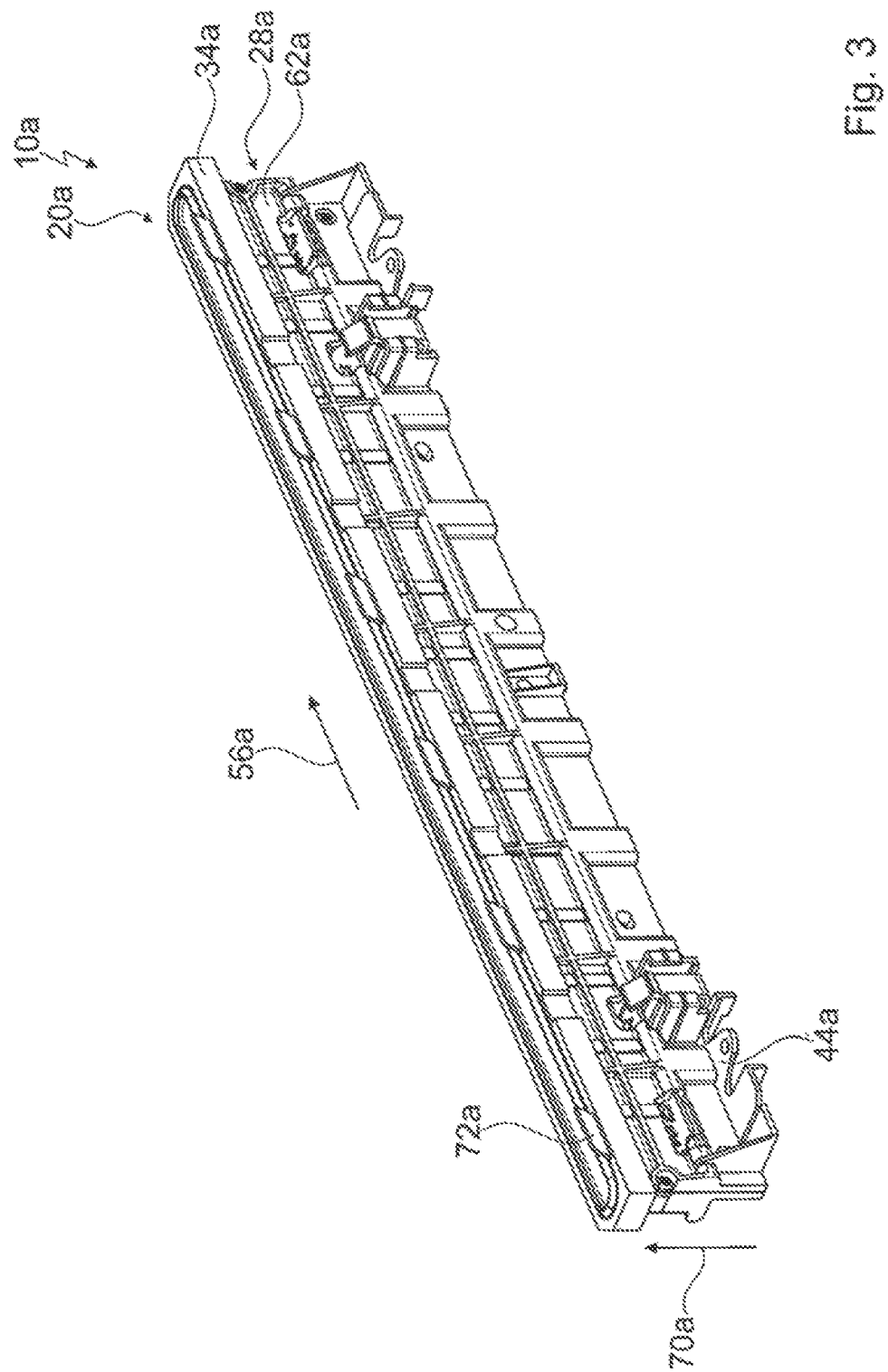
FIG. 3 shows one of the illumination strips in a perspective representation.
Figure 7:
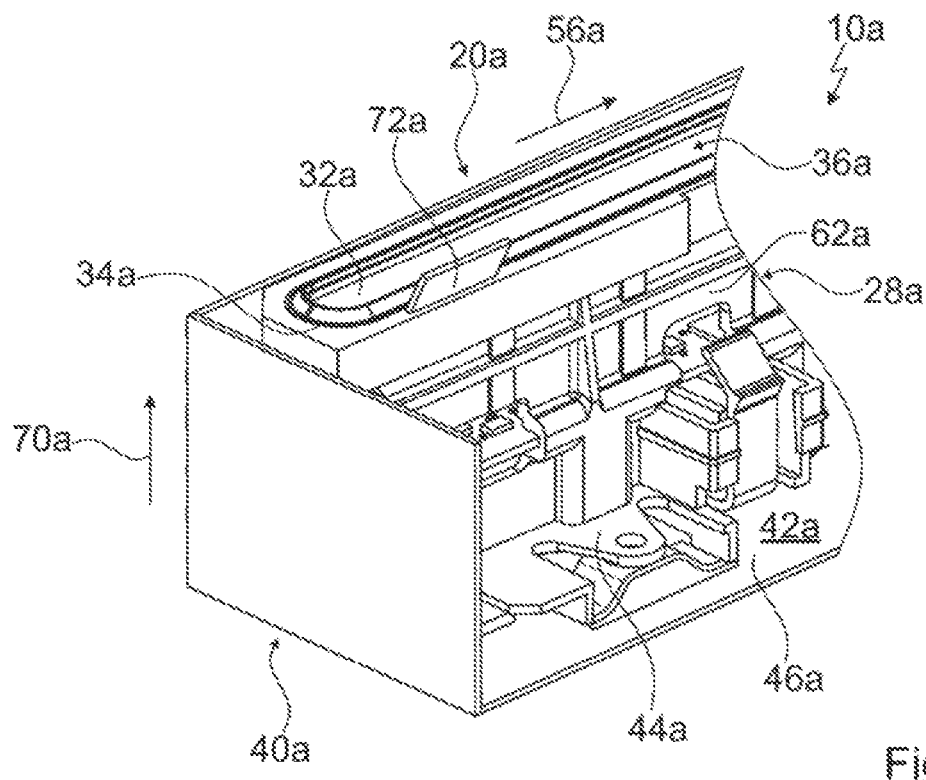
FIG. 7 shows a portion of the hob housing unit and the illumination strip from FIG. 3 in a perspective representation.
Figure 8:
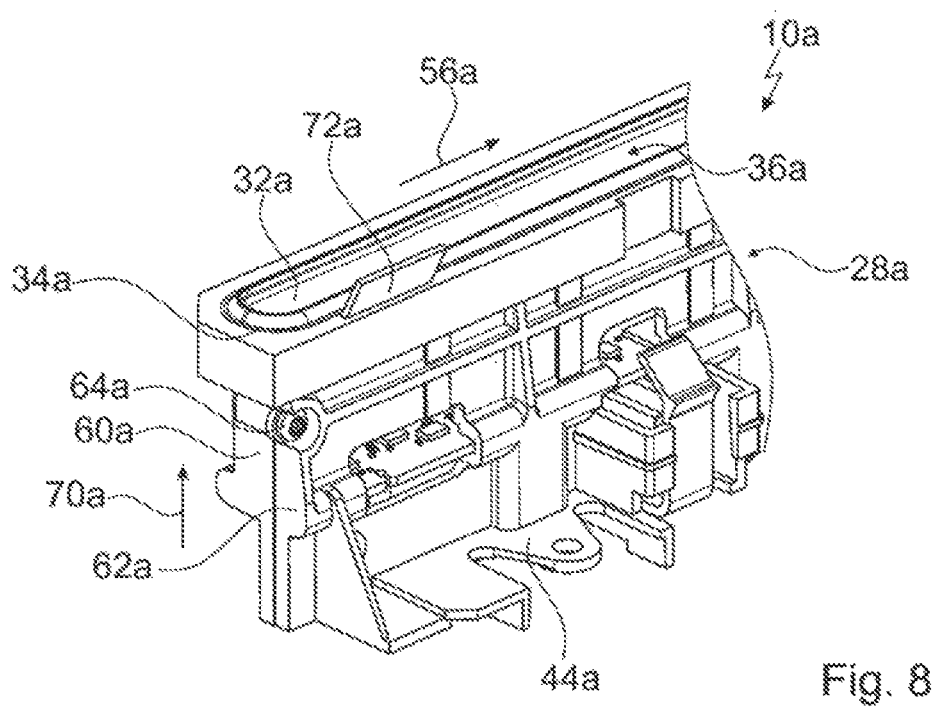
FIG. 8 shows a portion of the illumination strip from FIG. 3 in a perspective representation.
Figure 9:
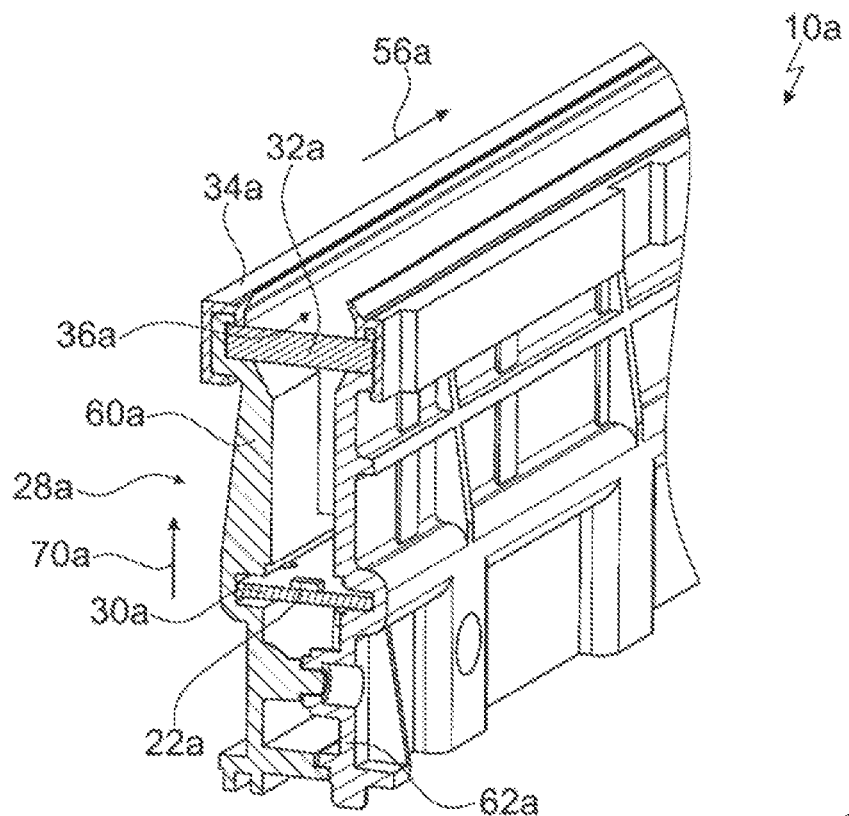
FIG. 9 shows the illumination strip from FIG. 3 in a partial sectional representation.

The hob device 10a has a hob outer housing unit 40a (see FIGS. 2 and 7). In an operating state, the hob outer housing unit 40a embodies part of the hob outer housing. The hob outer housing unit 40a embodies the hob outer housing together with the placement plate 12a in an operating state. The hob outer housing unit 40a partially defines a storage space 42a. In an operating state, the hob outer housing unit 40a defines the storage space 42a together with the placement plate 12a.

In the present exemplary embodiment, the hob device 10a has two illumination strips 20a (see FIGS. 1 to 9). Just one of the illumination strips 20a is described in the following. The illumination strip 20a has a lighting unit 22a (see FIG. 4). In addition to the lighting unit 22a, the illumination strip 20a has a large number of further lighting units 38a. Just one of the further lighting units 38a is described in the following.

Each lighting unit 22a, 38a is able to be actuated independently of other lighting units 22a, 38a. The further lighting unit 38a is able to be actuated independently of the lighting unit 22a. In the following, in place of all lighting units 22a, 38a, only the lighting unit 22a is described. An analogous description could also be performed for the further lighting unit 38a.

The lighting unit 22a is embodied as a colored lighting unit 22a. In an operating state, the lighting unit 22a emits light with different colors. The lighting unit 22a is provided for emitting light with at least two colors. In the present exemplary embodiment, the lighting unit 22a is provided for emitting light with 256 colors.

In an operating state, the illumination strip 20a is assigned to a large number of heating units 16a. In the present exemplary embodiment, for marking half of all the heating units 16a, the illumination strip 20a is assigned to said half of all the heating units 16a. For marking eighteen heating units 16a, the illumination strip 20a is assigned to the eighteen heating units 16a.

In the present exemplary embodiment, the illumination strip 20a has a longitudinal extension 24a of substantially 445 mm. In an operating state, the illumination strip 20a is arranged in parallel with a depth direction 54a. The illumination strip 20a has a longitudinal extension direction 56a, which is oriented in parallel with the depth direction 54a in an operating state.

In the present exemplary embodiment, the illumination strip 20a extends substantially over an entire depth extension 26a of the placement plate 12a. The placement plate 12a has a depth extension 26a of substantially 480 mm. The illumination strip 20a extends over substantially 93% of an entire depth extension 26a of the placement plate 12a.

The illumination strip 20a has a housing unit 28a (see FIGS. 2 to 9). In an operating state, the lighting unit 22a is largely arranged within the housing unit 28a. In an operating state, the lighting unit 22a is largely surrounded by the housing unit 28a.

The illumination strip 20a has a circuit board 30a (see FIGS. 4 to 6 and 9). In an operating state, the circuit board 30a is largely arranged within the housing unit 28a. In an operating state, the lighting unit 22a is arranged on the circuit board 30a. In an operating state, the lighting unit 22a is in electrical contact with the circuit board 30a.

The illumination strip 20a has a diffusion unit 32a (see FIGS. 2 to 9). The diffusion unit 32a is provided for scattering light emitted by the lighting unit 22a. In an operating state, the diffusion unit 32a scatters light emitted by the lighting unit 22a. In the present exemplary embodiment, the diffusion unit 32a has a cuboid shape in a cross-sectional plane, which in particular is oriented perpendicular to a longitudinal extension direction of the diffusion unit 32a.

In an operating state, the diffusion unit 32a is arranged on the housing unit 28a. In the present exemplary embodiment, the diffusion unit 32a is largely arranged within the housing unit 28a in an operating state.

The illumination strip 20a has at least one diffusion unit retaining element 58a. In the present exemplary embodiment, the illumination strip 20a has two diffusion unit retaining elements 58a, which in particular are arranged in mutually opposing end regions of the illumination strip 20a in relation to the longitudinal extension direction 56a of the illumination strip 20a. Just one of the diffusion unit retaining elements 58a is described in the following.

The diffusion unit retaining element 58a is arranged on the housing unit 28a. The diffusion unit retaining element 58a is connected to the housing unit 28a in one piece. In the present exemplary embodiment, the housing unit 28a is embodied in a two-piece manner. The housing unit 28a has a first housing subelement 60a and a second housing subelement 62a. In an operating state, the first housing subelement 60a and the second housing subelement 62a are fastened to one another.

The illumination strip 20a has at least one fastening means 64a. In the present exemplary embodiment, the illumination strip 20a has five fastening means 64a. Just one of the fastening means 64a is described in the following. In an operating state, the fastening means 64a fastens the first housing subelement 60a and the second housing subelement 62 to one another. In the present exemplary embodiment, the fastening means 64a is embodied as a screw.

The illumination strip 20a has a seal unit 34a (see FIGS. 2, 3 and 6 to 9). In an operating state, the seal unit 34a largely seals off a lighting region 36a between the housing unit 28a and the placement plate 12a. The seal unit 34a is provided for sealing off the lighting region 36a between the housing unit 28a and the placement plate 12a.

In an operating state, the housing unit 28a is partially arranged within the seal unit 34a. In an operating state, the seal unit 34a encloses a housing section of the housing unit 28a, in sections (see FIG. 9 in particular). The housing section of the housing unit 28a is arranged on a region of the housing unit 28a close to the placement plate 12a in an operating state.

The illumination strip 20a has a light separating unit 66a (see FIGS. 4 to 6). In an operating state, the light separating unit 66a is arranged on the housing unit 28a and in particular is connected to the housing unit 28a in one piece.

The light separating unit 66a has at least one light separating element 68a. The light separating unit 66a has a large number of light separating elements 68a in the present exemplary embodiment. Just one of the light separating elements 68a is described in the following. The light separating element 68a is embodied in a web-like manner. In an operating state, the light separating element 68a extends substantially in parallel with a vertical direction 70a.

In an operating state, the light separating unit 66a partially separates light portions from the lighting unit 22a and light portions from the further lighting unit 38a, in particular by means of the light separating element 68a. The light separating unit 66a is provided for at least partially separating light portions from the lighting unit 22a and light portions from the further lighting unit 38a, in particular by means of the light separating element 68a.

In the present exemplary embodiment, the illumination strip 20a has a large number of keep-clear elements 72a (see FIGS. 2 to 4 and 7 to 9). Just one of the keep-clear elements 72a is described in the following. During assembly, the keep-clear element 72a is provided for preventing a penetration of at least one object into the lighting region 36a partially defined by the illumination strip 20a.

In the present exemplary embodiment, the keep-clear element 72a is embodied in a tab-shaped manner. In an operating state, the keep-clear element 72a is arranged on the seal unit 34a and in particular is connected to the seal unit 34a in one piece.

In an operating state, the illumination strip 20a is largely arranged within the hob outer housing unit 40a. In an operating state, the illumination strip 20a is largely arranged within the storage space 42a.

In an operating state, the illumination strip 20a is fastened to a hob housing base 46a of the hob outer housing unit 40a (see FIGS. 2 and 7). The illumination strip 20a has two fastening elements 44a in the present exemplary embodiment. Just one of the fastening elements 44a is described in the following. In an operating state, the fastening element 44a fastens the housing unit 28a of the illumination strip 20a to the hob housing base 46a of the hob outer housing unit 40a. The fastening element 44a is provided for fastening the housing unit 28a to the hob housing base 46a of the hob outer housing unit 40a.

Figure 10:
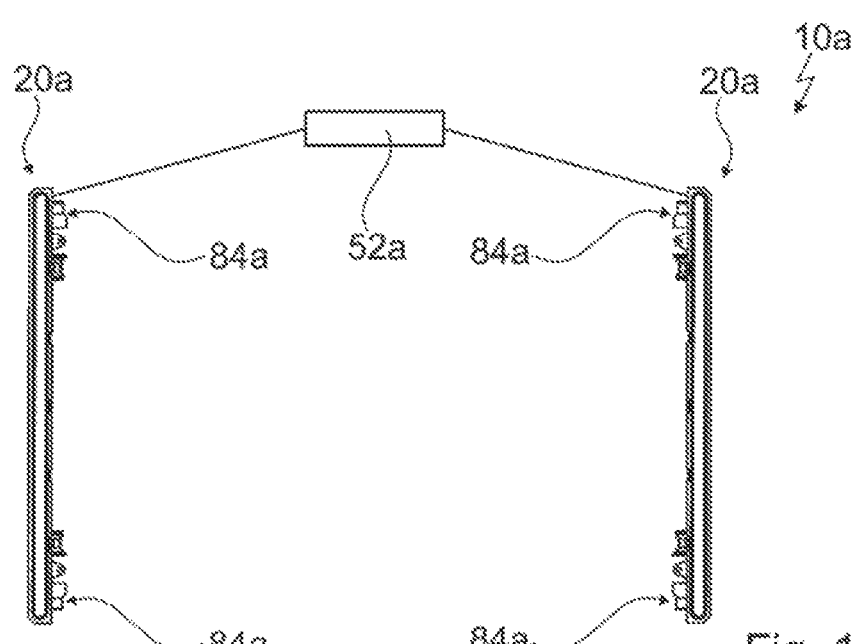
FIG. 10 shows the illumination strip from FIG. 3 and a control unit of the hob device in a schematic representation.

The illumination strip 20a is provided for actuation by the control unit 52a (see FIG. 10). The illumination strip 20a has at least one actuation connection 84a. In the present exemplary embodiment, the illumination strip 20a has two actuation connections 84a. In relation to the longitudinal extension direction 56a of the illumination strip 20a, the actuation connections 84a are arranged in mutually opposing end regions of the illumination strip 20a. This makes it possible for the illumination strip 20a to be assembled flexibly on any side of the hob, these in particular being arranged in mutually opposing end regions of the hob outer housing unit 40a in relation to a transverse direction.

In a method for operating the hob device 10a, half of all the heating units 16a are marked by means of a single illumination strip 20a in an operating state (see FIGS. 1 and 11 to 17).

For example, in an operating state, two items of cookware 14a are placed on the placement plate 12a (see FIG. 1). In an operating state, the illumination strip 20a indicates an extension 74a, 86a of each item of cookware 14a of the items of cookware 14a in relation to a direction 18a. In an operating state, the illumination strip 20a indicates an extension 74a of a first item of cookware 14a of the items of cookware 14a in the direction 18a. In an operating state, the illumination strip 20a indicates an extension 86a of a second item of cookware 14a of the items of cookware 14a in the direction 18a. The extension 74a of the first item of cookware 14a in the direction 18a is smaller than the extension 86a of the second item of cookware 14a in the direction 18a.

In addition to the extension 74a, 86a of the item of cookware 14a in relation to the direction 18a, in an operating state the illumination strip 20a indicates a position of each item of cookware 14a of the items of cookware 14a in relation to the direction 18a.

In an operating state, the illumination strip 20a indicates a heating state of the item of cookware 14a (see FIG. 1). In an operating state, the illumination strip 20a indicates the heating state of the item of cookware 14a, in particular embodied as a heating output, with varying colors. For example, the illumination strip 20a indicates a high heating state, in particular embodied as heating output, with a different color than a low heating state, in particular embodied as heating output. The different colors are characterized in FIG. 1 by different densities of hatch markings, wherein a dense hatch marking is assigned a high heating output and a broad hatch marking is assigned a low heating output.

Figure 11:
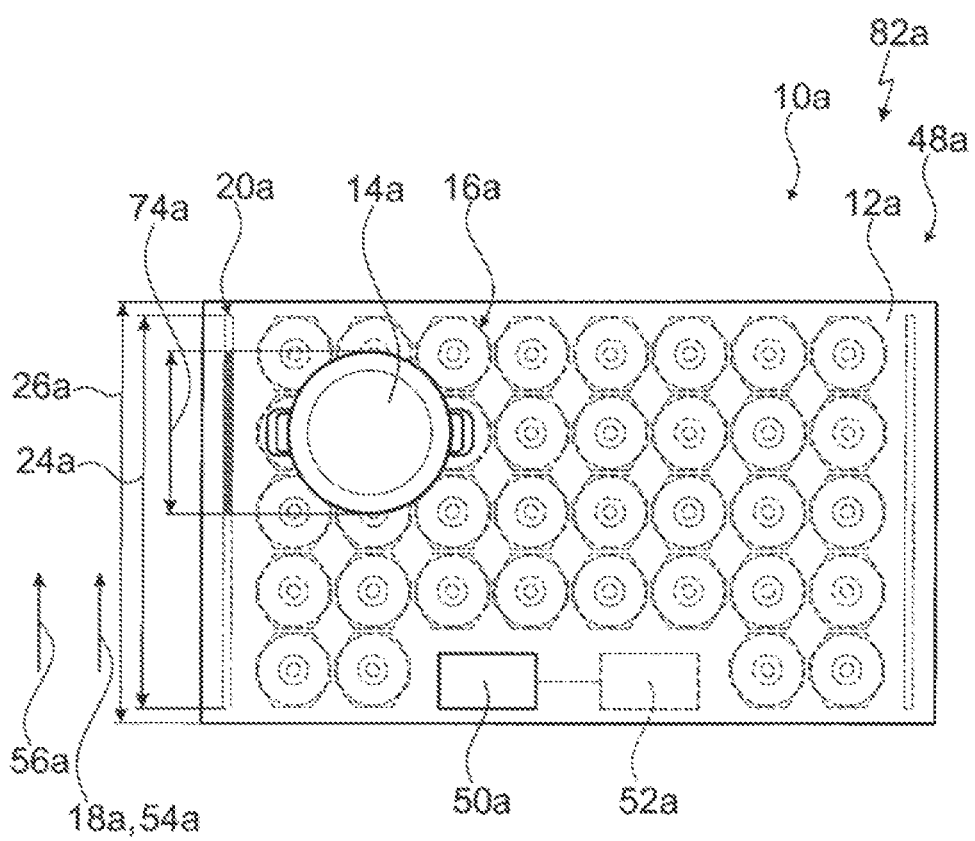
FIG. 11 shows the cooking system with the hob and with an item of cookware in an operating state in a schematic plan view.

For example, starting from the configuration from FIG. 1, an item of cookware 14a of the items of cookware 14a is removed from the placement plate 12a (see FIG. 11). In an operating state, the illumination strip 20a indicates a heating state embodied as residual heat. The illumination strip 20a indicates the heating state, in particular embodied as residual heat, even after the item of cookware 14a has been removed from the placement plate 12a, specifically in particular until a residual heat falls below a threshold value. For example, the illumination strip 20a indicates a high heating state, in particular embodied as residual heat, with a different color than a low heating state, in particular embodied as residual heat.

Figure 12:
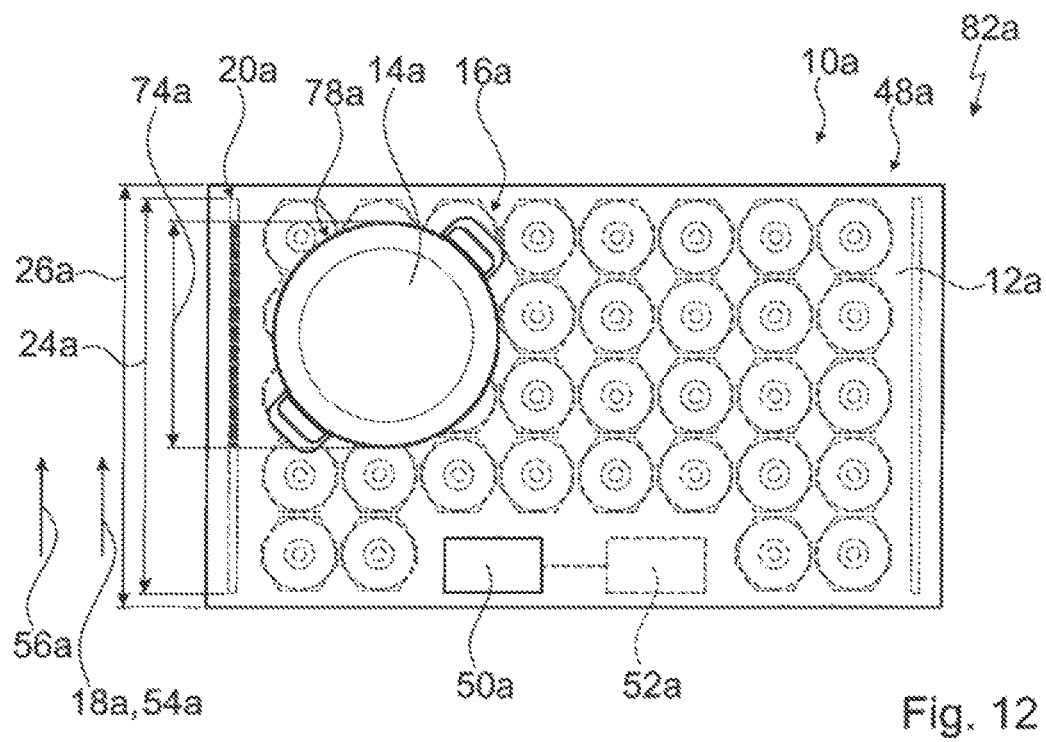
FIG. 12 shows the cooking system with the hob and with an item of cookware in an operating state in a schematic plan view.
Figure 13:
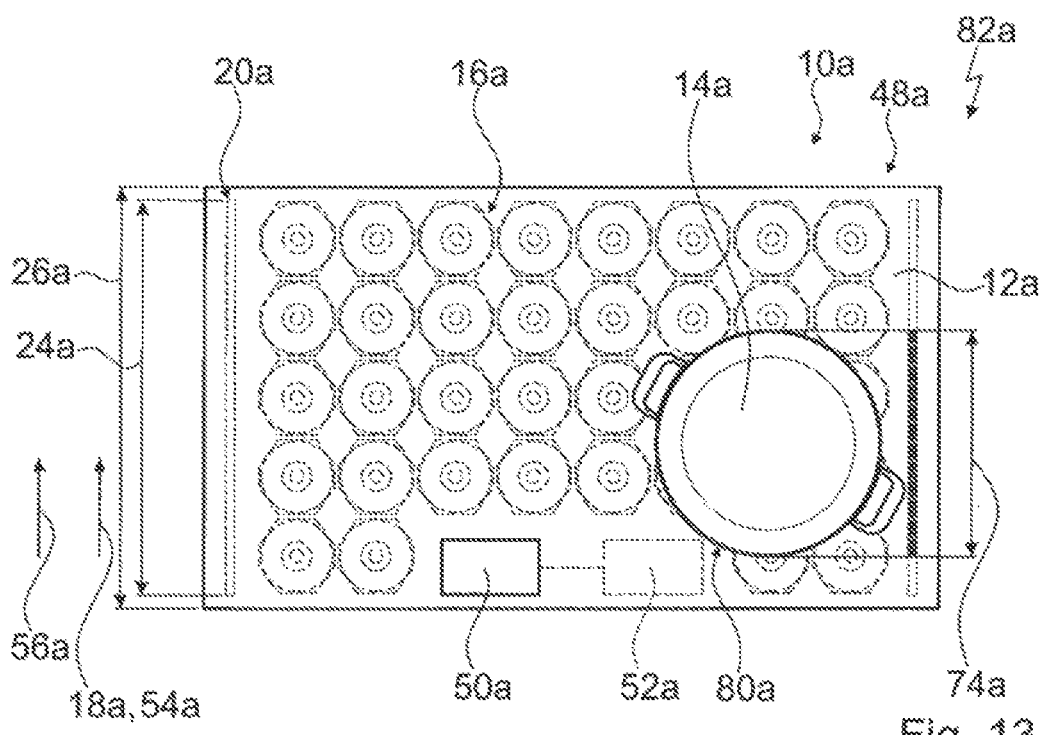
FIG. 13 shows the cooking system with the hob and with an item of cookware in an operating state in a schematic plan view.

In an operating state, the illumination strip 20a indicates a movement of the item of cookware 14a from a first placement position 78a to a second placement position 80a (see FIGS. 12 and 13). In an operating state, the illumination strip 20a indicates the movement of the item of cookware 14a by deactivating the illumination of the first placement position 78a and activating an illumination of the second placement position 80a. Before activating the illumination of the second placement position 80a, in an operating state, the illumination strip 20a indicates an operating prompt by changing an illumination property. In an operating state, before activating the illumination of the second placement position 80a, the illumination strip 20 indicates an animation, in order to transmit the operating prompt to the user in particular. In the present exemplary embodiment, the operating prompt is a prompt for confirming a movement of the item of cookware 14a from the first placement position 78a to a second placement position 80a.

Figure 14:
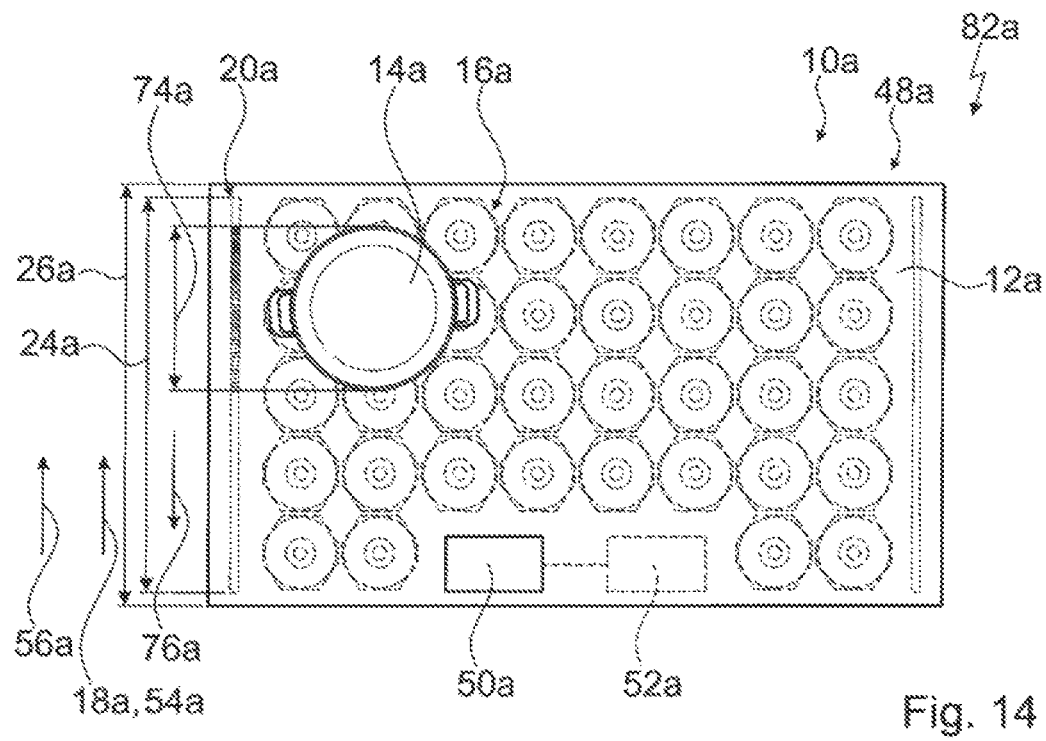
FIG. 14 shows the cooking system with the hob and with an item of cookware in an operating state in a schematic plan view.
Figure 15:
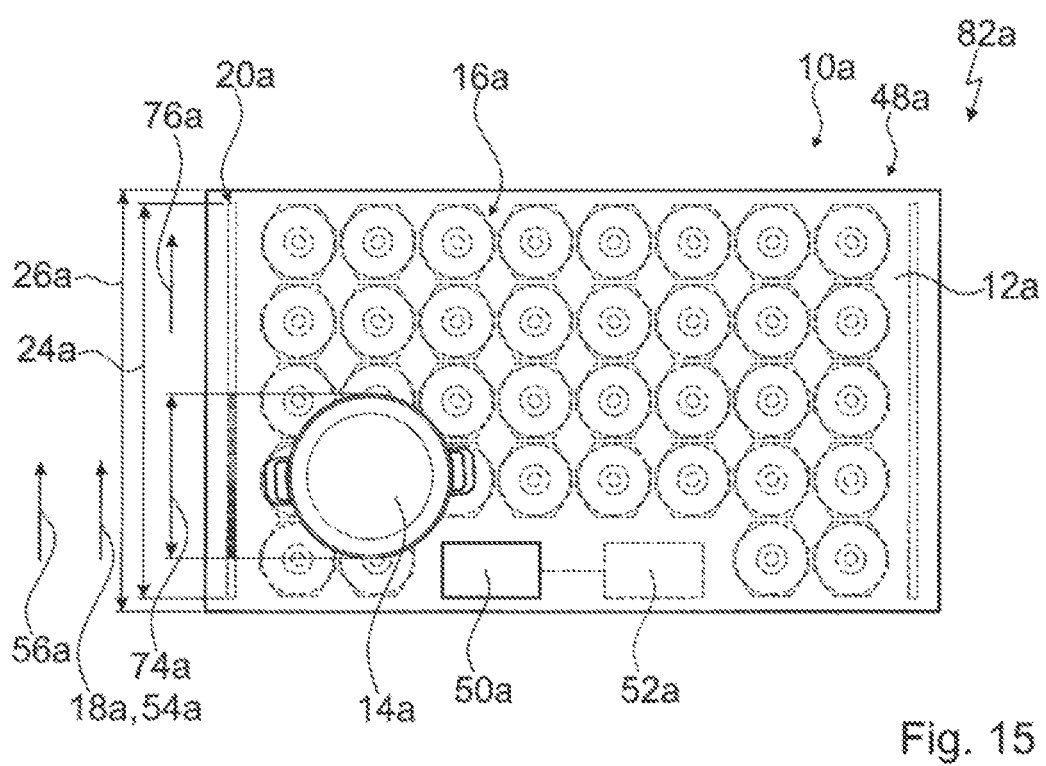
FIG. 15 shows the cooking system with the hob and with an item of cookware in an operating state in a schematic plan view.
Figure 16:
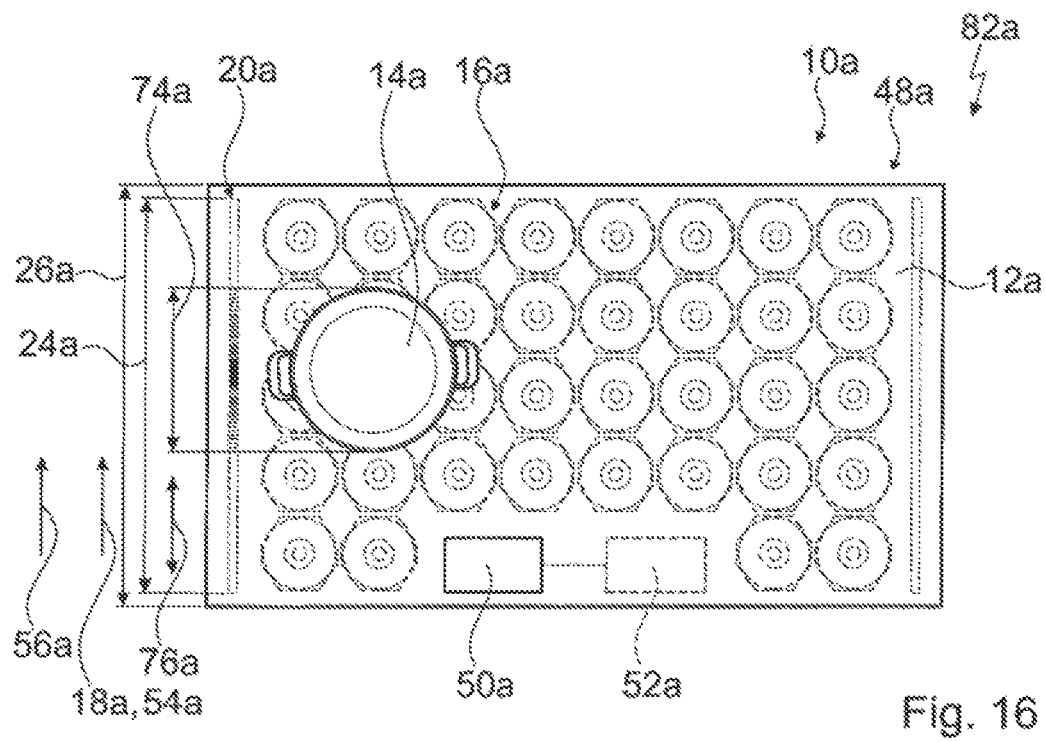
FIG. 16 shows the cooking system with the hob and with an item of cookware in an operating state in a schematic plan view.

In an operating state, the illumination strip 20a indicates a direction of movement 76a, in which the item of cookware 14a can be moved (see FIGS. 14 to 16). In an operating state, the illumination strip 20a indicates the direction of movement 76a by means of an intensity curve, specifically in particular by means of an intensity gradient. If, for example, an item of cookware 14a is placed in a rear region of the placement plate 12a, then the illumination strip 20a indicates the direction of movement 76a in the direction of a front region of the placement plate 12a (see FIG. 14). If, for example, an item of cookware 14a is placed in a front region of the placement plate 12a, then the illumination strip 20a indicates the direction of movement 76a in the direction of a rear region of the placement plate 12a (see FIG. 15). In the case of an item of cookware 14a, which is arranged in a central region of the placement plate 12a, the illumination strip 20a indicates the direction of movement 76a in the direction of a rear region of the placement plate 12a and in the direction of a front region of the placement plate 12a (see FIG. 16).

In a method for operating the hob device 10a, in an operating state, an extension 74a of the item of cookware 14a in relation to the direction 18a is indicated by means of the illumination strip 20a.

Figure 17:
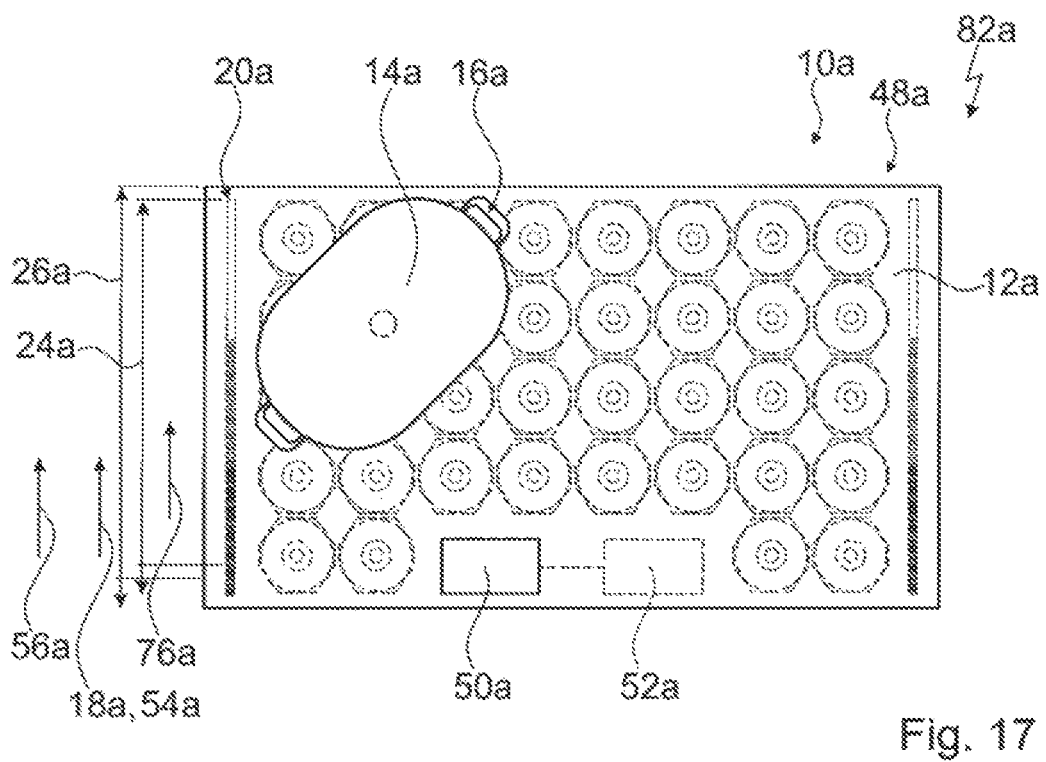
FIG. 17 shows the cooking system with the hob and with an item of cookware in an operating state in a schematic plan view.

In an operating state, the illumination strip 20a indicates an in particular predefined heating output, which varies in the direction 18a, in particular in addition or as an alternative to the extension 74a of the item of cookware 14a, in relation to the direction 18a (see FIG. 17). If, for example, an in particular predefined heating output in a front region of the placement plate 12a is greater than in a rear region of the placement plate 12a and the heating output decreases, in particular monotonically, from the front region in the direction of the rear region, then the illumination strip 20a indicates, in relation to the direction 18a, the in particular predefined heating output, which varies in the direction 18a, by means of an intensity curve and/or by means of a color curve and/or by means of a brightness curve.

Figure 18:
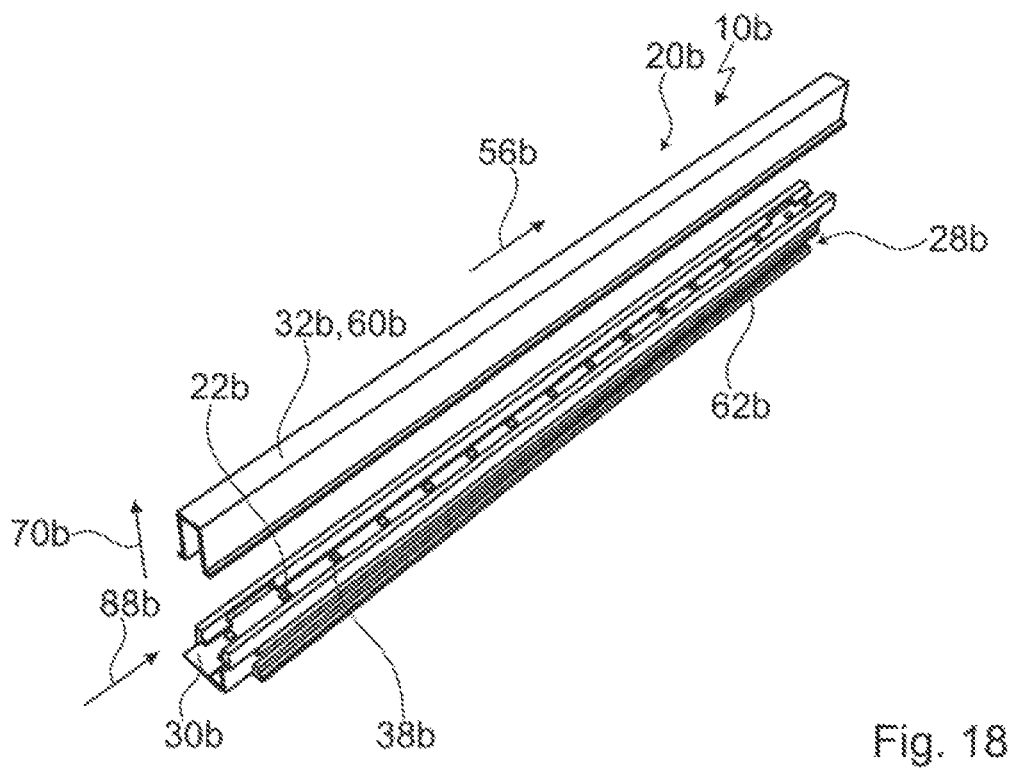
FIG. 18 shows an illumination strip of an alternative hob device in a perspective representation.
Figure 20:
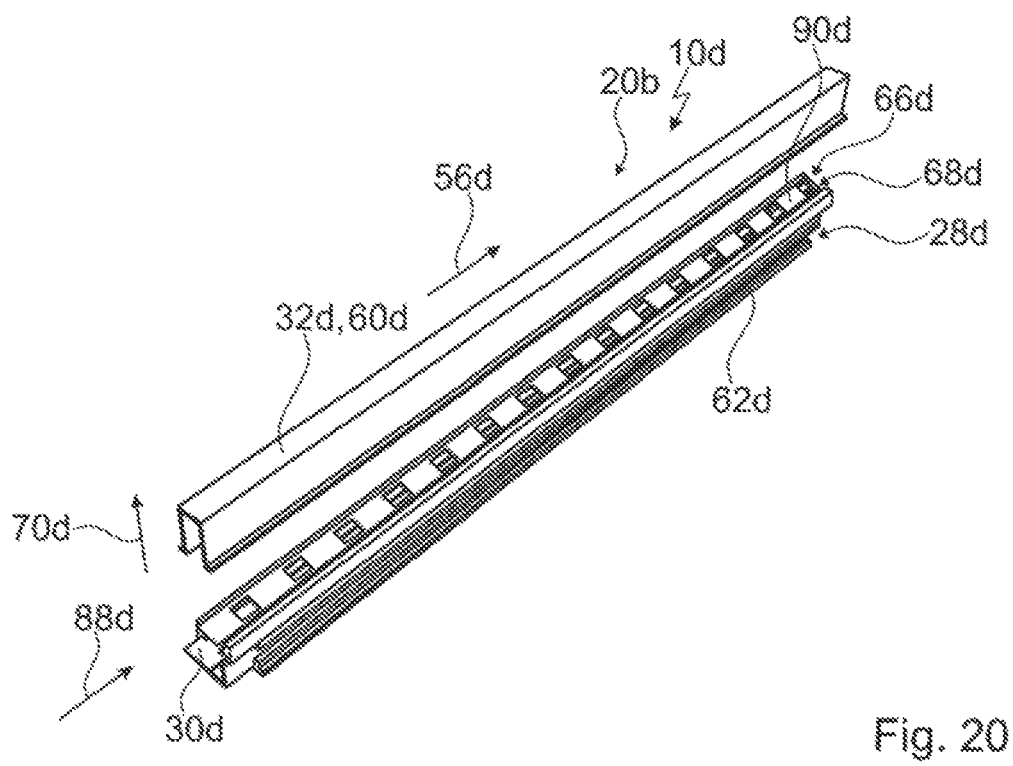
FIG. 20 shows an illumination strip of an alternative hob device in a perspective representation and FIG. 21 shows an illumination strip of an alternative hob device in a perspective representation.
Figure 21:
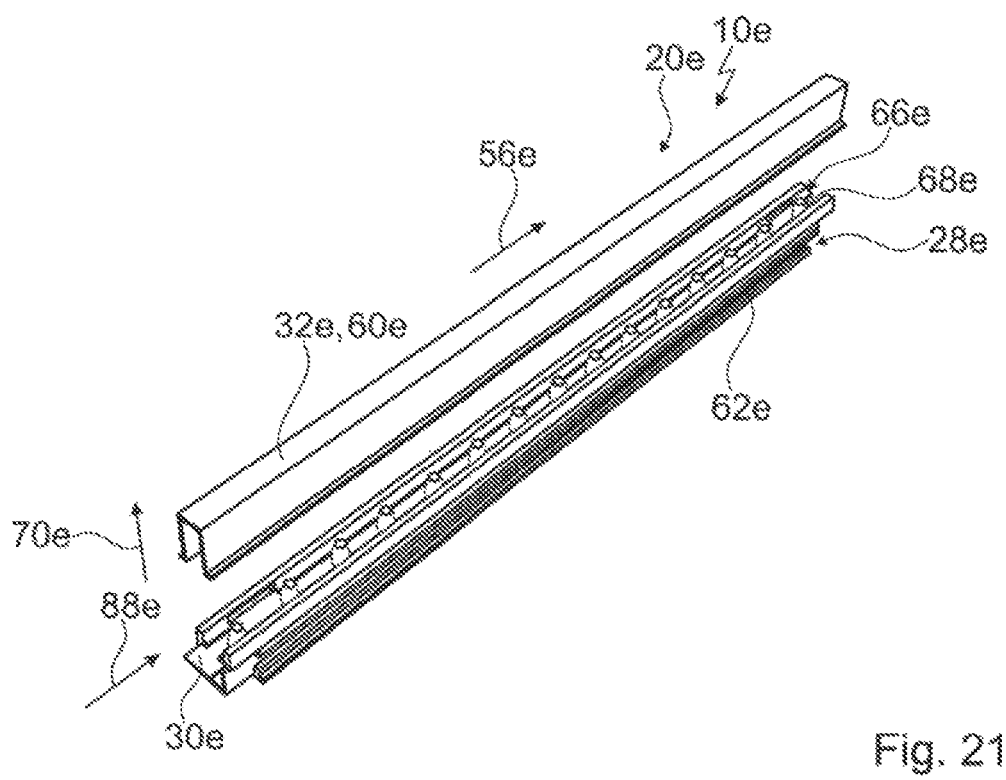

FIGS. 18 and 21 show further exemplary embodiments of the invention. The following descriptions are essentially restricted to the differences between the exemplary embodiments, wherein with regard to components, features and functions which remain the same, reference can be made to the description of the exemplary embodiment in FIGS. 1 to 17. In order to differentiate the exemplary embodiments, the letter a in the reference characters of the exemplary embodiment in FIGS. 1 to 17 is replaced by the letters b to e in the reference characters of the exemplary embodiment of FIGS. 18 to 21. With regard to parts that remain the same, in particular with regard to parts with the same reference characters, in principle, reference can also be made to the drawings and/or the description of the exemplary embodiment of FIGS. 1 to 17.

FIG. 18 shows an illumination strip 20b of an alternative hob device 10b. The illumination strip 20b has a diffusion unit 32b, which is provided for scattering light emitted by lighting units 22b of the illumination strip 20b. In the present exemplary embodiment, the diffusion unit 32b is U-shaped in a cross-sectional plane, which in particular is oriented perpendicular to a longitudinal extension direction of the diffusion unit 32b.

The illumination strip 20b has a housing unit 28b. In the present exemplary embodiment, the housing unit 28b is embodied in a two-piece manner. The housing unit 28b has a first housing subelement 60b and a second housing subelement 62b. In an operating state, the first housing subelement 60b and the second housing subelement 62b are fastened to one another. In an operating state, the first housing subelement 60a is arranged on a side of the illumination strip 20b close to a placement plate 12b. In an operating state, the second housing subelement 62a is arranged on a side of the illumination strip 20b remote from the placement plate 12b.

The diffusion unit 32b is embodied in one piece with the illumination strip 20b, specifically in particular with the first housing subelement 60b of the illumination strip 20b. In the present exemplary embodiment, the illumination strip 20b largely consists of plastic. The illumination strip 20b is free of a light separating unit.

In an operating state, a circuit board 30b of the illumination strip 20b is arranged within the housing unit 28b, specifically in particular within the second housing subelement 62b of the illumination strip 20b. The illumination strip 20b has a receiving groove (not shown), which in particular is arranged on the second housing subelement 62b. The receiving groove is provided for retaining and/or storing the circuit board 30b. During assembly, the circuit board 30b is introduced and/or inserted into the receiving groove in an insertion direction 88b. The insertion direction 88b is substantially oriented in parallel with a longitudinal extension direction 56b of the illumination strip 20b. In an operating state, the circuit board 30b is retained and/or stored in the receiving groove.

Figure 19:
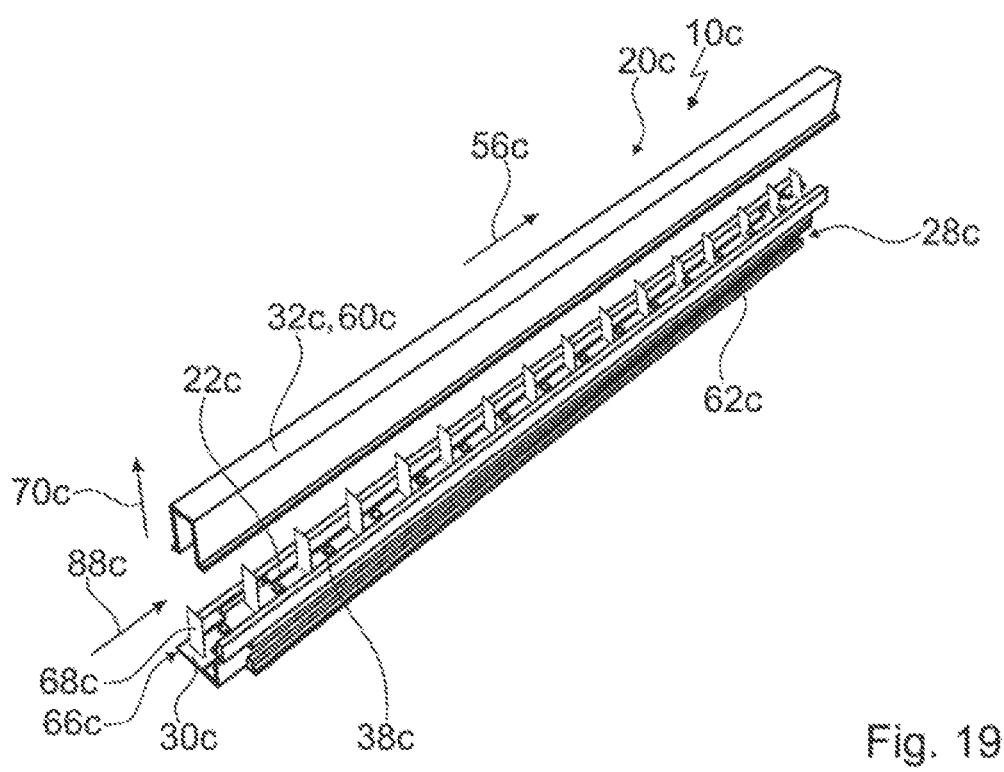
FIG. 19 shows an illumination strip of an alternative hob device in a perspective representation.

FIG. 19 shows an illumination strip 20c of an alternative hob device 10c. The illumination strip 20c has a light separating unit 66c. In an operating state, the light separating unit 66c is arranged within a housing unit 28c of the illumination strip 20c. In an operating state, the light separating unit 66c is arranged on a circuit board 30c of the illumination strip 20c. The light separating unit 66c and the housing unit 28c are embodied as separate objects.

The light separating unit 66c has a large number of light separating elements 68c. One light separating element 68c is arranged between two lighting units 22c of the illumination strip 20c arranged adjacent to one another, in relation to a longitudinal extension direction 56c of the illumination strip 20c, in each case. The light separating elements 68c are embodied in a web-like and/or small plate-like manner. In an operating state, the light separating unit 66c, in particular the light separating elements 68c of the light separating unit 66c, embodies light chambers with the housing unit 28c, in particular with the second housing subelement 62c of the housing unit 28c. A number of light chambers and a number of lighting units 22c are substantially identical.

FIG. 20 shows an illumination strip 20d of an alternative hob device 10d. The illumination strip 20d has a light separating unit 66d. In an operating state, the light separating unit 66d is arranged within a housing unit 28d of the illumination strip 20d. In an operating state, the light separating unit 66d is arranged at a distance from a circuit board 30d of the illumination strip 20d in relation to a vertical direction 70d. In an operating state, the light separating unit 66d is retained and/or stored by the housing unit 28d, specifically in particular in a second housing subelement 62d of the housing unit 28d.

The light separating unit 66d has a large number of light separating elements 68d. Just one of the light separating elements 68d is described in the following. The light separating element 68d is assigned to a lighting unit 22d of the illumination strip 20d. In the present exemplary embodiment, the light separating unit 66d is embodied in one piece. The light separating unit 66d has a base body 90d. The base body 90d is plate-shaped. The base body 90d has an elongated shape. The light separating element 68d is embodied as a recess and/or as an opening and/or as a hole in the base body 90d. An embodiment of the light separating unit 66d of this type is referred to as a "pinhole application".

FIG. 21 shows an illumination strip 20e of an alternative hob device 10e. The illumination strip 20e has a light separating unit 66e. In an operating state, the light separating unit 66e is arranged within a housing unit 28e of the illumination strip 20e. In an operating state, the light separating unit 66e is arranged on a circuit board 30e of the illumination strip 20e in relation to a vertical direction 70e. In an operating state, the light separating unit 66e is retained and/or stored by the circuit board 30e, specifically in particular indirectly or directly.

The light separating unit 66e has a large number of light separating elements 68e. In the present exemplary embodiment, the light separating unit 66e is embodied in multiple pieces. A number of light separating elements 68e and a number of lighting units 22e of the illumination strip 20e are identical. Just one of the light separating elements 68e and just one of the lighting units 22e is described in the following.

The light separating element 68e is assigned to the lighting unit 22e of the illumination strip 20e. In an operating state, the light separating element 68e is largely arranged above the lighting unit 22e in relation to a vertical direction 70e. In the present exemplary embodiment, the light separating element 68e is embodied as a collimator.

The invention claimed is:

1. A hob device, comprising:
   a placement plate configured for placement of an item of cookware;
   at least two heating units for heating the item of cookware; and
   an illumination strip including:
      a lighting unit;
      a housing unit, the lighting unit being arranged at least largely in the housing unit; and
      a seal unit, the seal unit configured to seal off a lighting region between the housing unit and the placement plate;
   wherein the illumination strip is assigned in an operating state to the at least two heating units for marking the at least two heating units.

2. The hob device of claim 1, constructed in the form of an induction hob device.

3. The hob device of claim 1, wherein the illumination strip has a longitudinal extension of at least 200 mm.

4. The hob device of claim 1, wherein the illumination strip is configured to indicate in an operating state, in relation to a direction, a heating output which varies in the direction.

5. The hob device of claim 1, wherein the illumination strip extends at least substantially over an entire depth extension of the placement plate.

6. The hob device of claim 1, wherein the illumination strip includes a circuit board arranged at least largely within the housing unit, said lighting unit being arranged on the circuit board.

7. The hob device of claim 1, wherein the illumination strip includes a diffusion unit configured to scatter light emitted by the lighting unit.

8. The hob device of claim 7, wherein the illumination strip includes a housing unit, said diffusion unit being arranged on the housing unit.

9. The hob device of claim 1, wherein the seal unit is configured to enclose at least one section of a housing section of the housing unit.

10. The hob device of claim 1, wherein the illumination strip includes a further lighting unit and a light separating unit, which in the operating state at least partially separates light portions from the lighting unit and light portions from the further lighting unit.

11. The hob device of claim 1, wherein the illumination strip includes a keep-clear element configured to prevent penetration of an object into a lighting region which is at least partially defined by the illumination strip during assembly.

12. The hob device of claim 1, further comprising a hob outer housing unit, said illumination strip including a fastening element configured to fasten the housing unit of the illumination strip to a hob housing base of the hob outer housing unit.

13. A hob, comprising a hob device, said hob device comprising a placement plate configured for placement of an item of cookware, at least two heating units for heating the item of cookware, and an illumination strip including: a lighting unit, a housing unit wherein the lighting unit is arranged at least largely in the housing unit, and a seal unit, the seal unit being configured to seal off a lighting region between the housing unit and the placement plate, wherein the illumination strip is assigned in an operating state to the at least two heating units for marking the at least two heating units.

14. The hob of claim 13, constructed in the form of an induction hob.

* * * * *